United States Patent
Kim et al.

(10) Patent No.: US 11,212,388 B2
(45) Date of Patent: Dec. 28, 2021

(54) SERVER, HOME APPLIANCE, AND METHOD FOR PROVIDING INFORMATION THEREIN

(71) Applicant: SAMSUNG ELECTRONICS CO., LTD., Suwon-si (KR)

(72) Inventors: Young-soo Kim, Suwon-si (KR); Ji-hye Jang, Suwon-si (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 0 days.

(21) Appl. No.: 16/640,596

(22) PCT Filed: Aug. 29, 2018

(86) PCT No.: PCT/KR2018/009967
§ 371 (c)(1),
(2) Date: Feb. 20, 2020

(87) PCT Pub. No.: WO2019/045440
PCT Pub. Date: Mar. 7, 2019

(65) Prior Publication Data
US 2020/0374393 A1 Nov. 26, 2020

(30) Foreign Application Priority Data
Aug. 31, 2017 (KR) .................. 10-2017-0111430

(51) Int. Cl.
*H04M 11/00* (2006.01)
*H04L 12/28* (2006.01)
(Continued)

(52) U.S. Cl.
CPC ........ *H04M 3/4931* (2013.01); *H04L 12/282* (2013.01); *H04L 67/12* (2013.01); *H04M 11/002* (2013.01); *H04L 2012/285* (2013.01)

(58) Field of Classification Search
None
See application file for complete search history.

(56) References Cited

U.S. PATENT DOCUMENTS 7,746,887 B2 6/2010 McFarland
8,019,571 B2 9/2011 Ban et al.
(Continued)

FOREIGN PATENT DOCUMENTS

CN 101422019 A 4/2009
CN 106293507 A 1/2017
(Continued)

OTHER PUBLICATIONS

Extended European Search Report dated Jun. 26, 2020 in corresponding European Patent Application No. 18850000.3.
(Continued)

*Primary Examiner* — Quoc D Tran
(74) *Attorney, Agent, or Firm* — Staas & Halsey, LLP

(57) ABSTRACT

Disclosed is a method for providing information in a server. Said method for providing information in a server includes: a step for repeatedly receiving at preset intervals, data related to a plurality of sensors provided in an electronic device; a step for storing the data received at the preset intervals; a step for comparing data corresponding to a first period and data corresponding to a second period among the stored data, and thereby sensing a change in the performance of the electronic device; and a step for providing guidance information corresponding to the sensed change in performance to a user terminal device which corresponds to the electronic device.

4 Claims, 20 Drawing Sheets

(51) Int. Cl.
*H04M 3/493* (2006.01)
*H04L 29/08* (2006.01)

(56) References Cited

U.S. PATENT DOCUMENTS

| | | | |
|---|---|---|---|
| 9,225,766 B2 | 12/2015 | Philip et al. | |
| 9,772,136 B2 | 9/2017 | Shim et al. | |
| 10,007,530 B2 | 6/2018 | Jung et al. | |
| 10,467,701 B1* | 11/2019 | Corder | G06Q 40/08 |
| 10,623,509 B2* | 4/2020 | Delinselle | H04L 67/22 |
| 2006/0173653 A1* | 8/2006 | Chian | F24H 9/2007 |
| | | | 702/182 |
| 2007/0242688 A1 | 10/2007 | McFarland | |
| 2011/0054844 A1 | 3/2011 | Han et al. | |
| 2012/0019378 A1* | 1/2012 | Watson | H04L 12/2825 |
| | | | 340/539.1 |
| 2014/0278681 A1* | 9/2014 | Cox | G06Q 30/0623 |
| | | | 705/7.19 |
| 2015/0302414 A1* | 10/2015 | Cox | G06Q 30/0641 |
| | | | 705/7.19 |
| 2015/0330650 A1* | 11/2015 | Abiprojo | F24F 11/62 |
| | | | 700/276 |
| 2016/0358537 A1 | 12/2016 | Kang et al. | |
| 2016/0378511 A1 | 12/2016 | Jung et al. | |
| 2017/0205791 A1 | 7/2017 | Yang et al. | |
| 2017/0280188 A1* | 9/2017 | Mullins | H04N 21/242 |
| 2020/0003659 A1* | 1/2020 | Davies | G06N 3/084 |

FOREIGN PATENT DOCUMENTS

| | | |
|---|---|---|
| CN | 106461252 A | 2/2017 |
| JP | 2006-190324 | 7/2006 |
| KR | 2002-0006816 | 1/2002 |
| KR | 10-2006-0004697 | 1/2006 |
| KR | 10-2006-0044228 | 5/2006 |
| KR | 10-0987429 | 10/2010 |
| KR | 10-2012-0105234 | 9/2012 |
| KR | 10-2013-0142004 | 12/2013 |
| KR | 10-1553843 | 9/2015 |
| KR | 10-2016-0006832 | 1/2016 |
| KR | 10-2016-0010785 | 1/2016 |
| WO | WO 2015/175821 A1 | 11/2015 |

OTHER PUBLICATIONS

International Search report dated Dec. 12, 2018, in corresponding International Patent Application No. PCT/KR2018/009967.

Written Opinion of the International Searching Authority dated Dec. 12, 2018, In corresponding International Patent Application No. PCT/KR2018/009967.

European Communication dated Mar. 11, 2021 in European Patent Application No. 18850000.3.

Notification of First Office Action Issued by Chinese Patent Office for Chinese Application No. 201880055089.8 dated Jun. 3, 2021.

* cited by examiner

FIG. 16

SERVER, HOME APPLIANCE, AND METHOD FOR PROVIDING INFORMATION THEREIN

CROSS-REFERENCE TO RELATED APPLICATIONS

This application is a U.S. National Stage Application which claims the benefit under 35 U.S.C. § 371 of International Patent Application No. PCT/KR2018/009967 filed on Aug. 29, 2018, which claims foreign priority benefit under 35 U.S.C. § 119 of Korean Patent Application No. 10-2017-0111430 filed on Aug. 31, 2017, in the Korean Intellectual Property Office, the contents of all of which are incorporated herein by reference.

TECHNICAL FIELD

Apparatuses consistent with the present disclosure relate to a server, a home appliance, and a method for providing information therein, and more particularly, to a server and a home appliance, which provide information for efficient use of an electronic device by allowing a consumer to regularly check a status of the electronic device, and a method for providing information therein.

BACKGROUND ART

In accordance with the development of electronic technology, various types of electronic devices are developed and become popular. Examples of electronic devices popular in homes may include washing machines, dryers, air conditioners, electric ranges, microwave ovens, ovens, refrigerators, air cleaners and the like.

Meanwhile, in case that these electronic devices are determined to have failed, a display or a control device of the product displays details of the failure. Each of the electronic devices has a function to display the failure details to a user after the failure. However, the electronic device does not have a function to display a guide such as alerting the user before the failure occurs.

In case that the electronic device works out but producing degraded performance, the device may not have a failure but this degraded performance may be inconvenient for the user. To solve this problem, there has been inconvenient for the user to contact an after-sales service (A/S) center or request a visiting service.

As a cloud environment is recently introduced, the user may receive various information through a user terminal device.

However, no method has been proposed in a prior art to analyze data transmitted from an electronic device, analyze causes of symptoms of the degraded performance in the electronic device and provide a related guide.

In addition, even before the failure, no method has been proposed in the prior art to analyze the data to determine whether the user uses the electronic device in a correct manner, and to provide a guide on how to use the device in case that the user uses the device in an incorrect manner.

DISCLOSURE

Technical Problem

The disclosure provides a server and a home appliance, in which the server compares and analyzes data measured by an electronic device to provide a user with user guide information, and a method for providing information therein.

Technical Solution

According to an embodiment in the disclosure, a method for providing information in a server may include: receiving data of a plurality of sensors included in an electronic device repeatedly in a predetermined period unit; storing the data received in the predetermined period unit; detecting a performance change of the electronic device by comparing data for a first period with data for a second period among the stored data; and providing user guide information corresponding to the detected performance change to a user terminal device corresponding to the electronic device.

In this case, in the detecting of the performance change, the performance change may be detected by at least one sensor among a plurality of performances of the electronic device by comparing a value measured by the at least one sensor for the first period with a value measured by the at least one sensor for the second period.

In this case, the value measured by the at least one sensor may be an average value of a plurality of data measured by the at least one sensor for the first period or the second period.

In this case, in the detecting of the performance change, degraded performance of a water supply filter in a washing machine may be detected by comparing water supply time for the first period with water supply time for the second period detected by a water supply sensor detecting water supply of the washing machine.

In addition, in the detecting of the performance change, degraded performance of a water supply filter in the washing machine may be detected by comparing water supply time for the first period with water supply time for the second period detected by a water drainage sensor detecting water drainage of the washing machine.

In addition, in the detecting of the performance change, whether an inlet of an outdoor device of an air conditioner is blocked may be detected by comparing an outdoor temperature for the first period with an outdoor temperature for the second period detected by an outdoor temperature sensor detecting a temperature around the outdoor device of the air conditioner.

In addition, in the detecting of the performance change, whether an internal load of an indoor in case that the air conditioner is operated is increased may be detected by comparing an indoor temperature for the first period with an indoor temperature for the second period detected by an indoor temperature sensor detecting the indoor temperature.

In addition, in the providing of the user guide information, information on a location at which the detected performance change occurs and information on a scheme of the electronic device may be provided together.

In addition, in the providing of the user guide information, it may be determined whether the detected performance change is repairable by a user action or requires a professional consultation, and in case of determining that the professional consultation is required, information on a list of the after-sales service (A/S) centers closest to a user address and information on telephone numbers of the corresponding A/S centers may be provided together.

Meanwhile, according to another embodiment in the disclosure, a home appliance may include: a plurality of sensors detecting whether the home appliance performs a predetermined function; a communicator transmitting data detected by the plurality of sensors to a server repeatedly in a predetermined period unit; and a processor configured to control to receive guide information corresponding to a performance change of the home appliance from the server and controlling a display to display the guide information.

In this case, the home appliance may be any one of an air conditioner, a washing machine, a refrigerator, a cooking appliance and a cleaner.

In addition, the server according to an embodiment in the disclosure may include: a communicator receiving data of a plurality of sensors included in an electronic device repeatedly in a predetermined period unit; a memory storing the data received in a predetermined period unit; and a processor detecting a performance change of the electronic device by comparing data for a first period with data for a second period among the stored data, and providing guide information corresponding to the detected performance change of the electronic device to a user terminal device corresponding to the electronic device.

In this case, the processor may detect the performance change of the electronic device measured by at least one sensor among a plurality of performances of the electronic device by comparing a value measured by the at least one sensor for the first period with a value measured by the at least one sensor for the second period.

In this case, the value measured by the at least one sensor may be an average value of a plurality of data measured by the at least one sensor for the first period or the second period.

In addition, the processor may detect degraded performance of a water supply filter in a washing machine by comparing water supply time for the first period with water supply time for the second period detected by a water supply sensor detecting water supply of the washing machine.

In addition, the processor may detect degraded performance of a water supply filter in the washing machine by comparing water supply time for the first period with water supply time for the second period detected by a water drainage sensor detecting water drainage of the washing machine.

In addition, the processor may detect whether an inlet of the outdoor device of the air conditioner is blocked by comparing an outdoor temperature for the first period with an outdoor temperature for the second period detected by an outdoor temperature sensor detecting a temperature around the outdoor device of the air conditioner.

In addition, the processor may detect whether an internal load of an indoor in case that the air conditioner is operated is increased by comparing an indoor temperature for the first period with an indoor temperature for the second period detected by an indoor temperature sensor detecting an indoor temperature.

In addition, the processor may provide information on a location at which the detected performance change occurs and information on a scheme of the electronic device together.

In addition, the processor may determine whether the detected performance change is repairable by a user action or requires the professional consultation, and in case of determining that the professional consultation is required, the processor may provide the user with information on a list of the after-sales service (A/S) centers closest to a user address and information on telephone numbers of the corresponding A/S centers together.

DESCRIPTION OF DRAWINGS

FIGS. 14 to 16 are diagrams illustrating a method for requesting a service in a user terminal device;

BEST MODE

Figure 1:
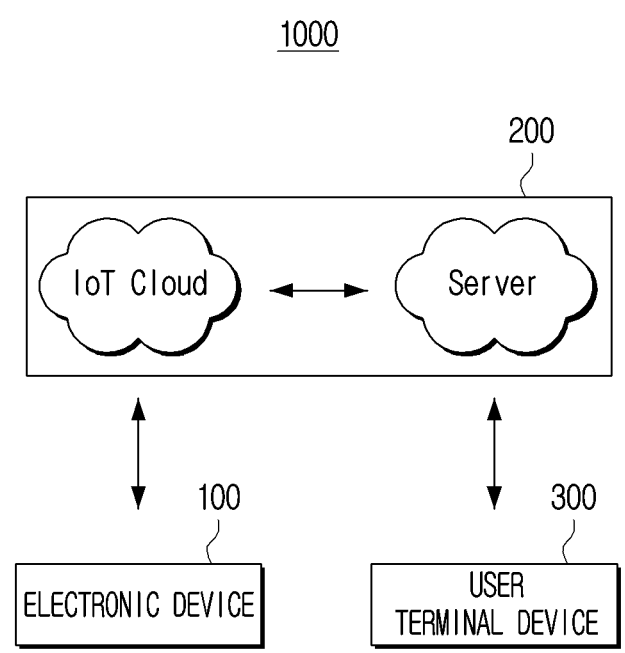
FIG. 1 is a block diagram illustrating a system for providing user guide information according to an embodiment in the disclosure.

Prior to describing the disclosure in detail, a description method of the specification and drawings is described.

First, the terms used in the specification and claims are selected as general terms in consideration of the functions in various embodiments in the disclosure, and may be changed depending on the intention of those skilled in the art, legal or technical interpretation, the emergence of a new technique and the like. In addition, some terms arbitrarily chosen by an applicant may exist. In this case, the meanings of such terms are mentioned in detail in corresponding description portions of the disclosure. Therefore, unless defined in detail, these terms may be interpreted on the basis of the contents throughout the disclosure and common technical knowledge in the art unless defined in detail.

In addition, throughout the accompanying drawings of the specification, the same reference numerals denote parts or components performing substantially the same functions. For convenience of explanation and understanding, different embodiments are described using the same reference numerals. That is, even though all the components having the same reference numerals are illustrated in a plurality of drawings, the plurality of drawings do not illustrate one embodiment.

In addition, terms including ordinal numbers, such as "first", "second" and the like, may be used to distinguish various components from each other in the specification and claims. Such terms may be used only to distinguish one component from another component, and are not to be construed as being limited to the terms. For example, components combined with these ordinal numbers should not be limited in their order of use or placement. If necessary, the ordinal numbers may be used interchangeable.

In the specification, singular forms include plural forms unless the context clearly indicates otherwise. It is further understood that a term "include" or "formed of" used in the specification specifies the presence of features, numerals, steps, operations, components, parts or combinations thereof, which is mentioned in the specification, and does not preclude the presence or addition of one or more other features, numerals, steps, operations, components, parts or combinations thereof.

The disclosure may be variously modified and have several forms. Therefore, specific embodiments in the disclosure are illustrated in the accompanying drawings and described in detail in the specification. However, it is to be understood that the disclosure is not limited to specific embodiments, but includes all modifications, equivalents, and substitutions without departing from the scope and spirit of the disclosure. When it is decided that a detailed description for the known art related to the disclosure may obscure the gist of the disclosure, the detailed description is omitted.

Terms 'first', 'second' and the like, may be used to describe various components, but the components are not to be construed as being limited by these terms. The terms are used only to distinguish one component from another component.

Terms used in the disclosure are used only to describe specific embodiments rather than limiting the scope of the disclosure. Singular forms used herein are intended to include plural forms unless explicitly indicated otherwise. It is further understood that a term "include" or "formed of" used in the specification specifies the presence of features, numerals, steps, operations, components, parts or combinations thereof, which is mentioned in the specification, and does not preclude the presence or addition of one or more other features, numerals, steps, operations, components, parts or combinations thereof.

In the embodiments in the disclosure, a term such as a "module", "unit", "part" or the like is used to refer to a component which performs at least one function or operation. This component may be implemented by hardware or software or be implemented by a combination of hardware and software. In addition, pluralities of "modules", "units", "parts" or the like may be integrated in at least one module or chip and be implemented by at least one processor except for each of the pluralities of "modules", "units", "parts" or the like which needs to be implemented by a specific hardware.

In addition, in an embodiment in the disclosure, a case in which any portion is referred to as being connected to another portion not only includes a case in which any one portion and another portion are directly connected to each other, but also includes a case in which any one portion and another portion are indirectly connected to each other through the other medium. In addition, unless explicitly described otherwise, to include any components is to be understood to imply the inclusion of other components rather than the exclusion of any other components.

In addition, in an embodiment in the disclosure, an after-sales service (A/S) may refer to a visiting service for repair, and expressions including a service request and a service center may be related to the after-sales service (A/S).

As described above, a system 1000 for providing user guide information according to an embodiment in the disclosure may compare data of the electronic device 100 with each other by performing an operation of receiving the data at a predetermined period, and may detect a performance change of the electronic device 100 by performing an operation of comparing the data with each other.

Detecting the performance change of the electronic device 100 may be different from determining whether a failure occurs from the device. Even in case that the user determines that the device has the degraded performance, the system 1000 may provide the user with a guide to solve this problem.

In addition, the system 1000 for providing the user guide information may provide the user with a guide displaying a recommendation for a usage pattern or a mode for a specific operation. Therefore, the user may easily maintain or change a suitable setting for the user.

In addition, a guide provided by the system 1000 for providing the user guide information may include a user interface (UI) element for an after-sales service (A/S) request. Therefore, it may be convenient for the user because the user needs not to separately deliver information and symptoms of the electronic device 100 to a counselor for a long time.

In addition, through a process of detecting the performance change of the device and notifying this change to the user, the system 1000 for providing the user guide information may recognize an incorrect usage operation of the device although the user does not determine that the device has the failure. In a long term view, life expectancy of the electronic device 100 may be extended and the consumer may have increased satisfaction, by correcting such an incorrect usage of the device which is not recognized by the user.

FIG. 1 is a block diagram illustrating a system 100 for providing user guide information according to an embodiment in the disclosure.

Referring to FIG. 1, a system for providing the user guide information may include an electronic device 100, a server 200, and a user terminal device 300.

The electronic device 100 may be a home appliance such as an air conditioner, a washing machine, a refrigerator, a cooking appliance and a cleaner.

In this case, the electronic device 100 may transmit data to the server 200 and may receive specific information from the server 200.

In addition, the electronic device 100 may change a predetermined period of a data transmission depending on a user setting. That is, the electronic device 100 may be set to transmit data not at a certain point in time, but from a moment at which the electronic device 100 is turned on to a moment at which the electronic device 100 is turned off.

Meanwhile, the electronic device 100 may be a home appliance. The home appliance may be any one of an air conditioner, a washing machine, a refrigerator, a cooking appliance, and a cleaner. The home appliance may also be one of various home appliances excluding the above listed devices.

The server 200 may be an internet of things (IoT) cloud server. In this case, the server 200 may provide specific information to the electronic device 100 or the user terminal device 300 and may receive data from each of the electronic device 100 and the user terminal device 300. The server 200 may include the memory storing the data received in a predetermined period unit, and the server 200 may detect the performance change of the electronic device 100 by comparing data for (corresponding to) a first period with data for (corresponding to) a second period among the stored data, and provide guide information corresponding to the detected performance change of the electronic device 100 to the user terminal device 300 corresponding to the electronic device 100.

In this case, the server 200 may detect a performance change of the electronic device 100 measured by at least one sensor among a plurality of performances of the electronic device 100 by comparing a value measured by the at least one sensor for the first period with a value measured by the at least one sensor for the second period.

In this case, the value measured by the at least one sensor may be an average value of a plurality of data measured by the at least one sensor for the first period or the second period.

In addition, the server 200 may compare water supply time for the first period with water supply time for the second period detected by a water supply sensor detecting water supply of the washing machine, and then detect degraded performance of a water supply filter in the washing machine.

In addition, the server 200 may detect degraded performance of a water supply filter in the washing machine by comparing the water supply time for the first period with the water supply time for the second period detected by a water drainage sensor detecting water drainage of the washing machine.

In addition, the server 200 may detect whether an inlet of the outdoor device of the air conditioner is blocked by comparing an outdoor temperature for the first period with an outdoor temperature for the second period detected by an outdoor temperature sensor detecting a temperature around the outdoor device of the air conditioner.

In addition, the server 200 may detect whether an internal load of an indoor in case that the air conditioner is operated is increased by comparing an indoor temperature for the first period with an indoor temperature for the second period detected by an indoor temperature sensor detecting the indoor temperature.

In addition, the server 200 may provide the user with information on a location at which the detected performance change occurs and information on a scheme of the electronic device 100 together.

In addition, the server 200 may determine whether the detected performance change is repairable by a user action or requires a professional consultation, and in case of determining that the professional consultation is required, the server 200 may provide the user with information on a list of the after-sales service (A/S) centers closest to a user address and information on telephone numbers of the corresponding A/S centers together.

In addition, the server 200 may provide a guide for automatically solving this problem by automatically updating the software of the electronic device.

Meanwhile, the server 200 may include a plurality of servers. For example, one server may serve to collect information and another server may serve to provide the information.

Meanwhile, Tables 1 to 3 to be described below explain that the server analyzes data of the electronic device 100.

The contents of Tables 1 to 3 each related to a determination condition and a cause analysis of degraded performance of the electronic device 100 are merely exemplary and are not necessarily the same. In addition, the conditions may be changed depending on an administrator's setting and the user's setting.

TABLE 1

| Product | No. | Symptom | Cause | Determination condition | Note |
|---|---|---|---|---|---|
| Air conditioner | 1 | Weak cooling | Blocked inlet of the outdoor device | Outdoor temperature (at 21 min) minus (−) Outdoor temperature (at 7 min) >10° C. & Outdoor temperature (at 21 min) >45° C. | Case in which the outdoor temperature is 45° C. or more at 21 minutes after the device is turned on, and this temperature is a temperature increased by more than 10 degrees compared to the temperature at 7 minutes after the device is turned on |
|  | 2 | Weak cooling | Insufficient refrigerant | Calculate an evaporation amount based on a temperature difference and check whether this amount is lower than a predetermined evaporation amount |  |
|  | 3 | Weak cooling | Increased internal load of the indoor (due to sunlight and insufficient insulation) | Indoor temperature (at 7 min) minus (−) Set temperature (at 7 min) >3° C. & Indoor temperature (at 7 min) minus (−) Indoor temperature (current) ≤2° C. | Case in which the temperature is not lowered |
|  | 4 | Weak cooling | Blocked inlet of the indoor device (by a curtain or a filter) | Indoor temperature ≥20° C. & Outdoor temperature 20° C. & Indoor device turned on & Condition to enter a freeze prevention control continuously detected twice |  |

Referring to Table 1, in case that the electronic device is the air conditioner, the air conditioner may have the symptom of a weak cooling function (hereinafter, a weak cooling symptom. There may be various causes of these symptoms, and the processor may determine a corresponding cause based on a predetermined condition.

The electronic device may transmit data measured by the sensor to the server in the predetermined period unit. In this case, the server may analyze the received data to determine problems occurring in the electronic device.

In case that the electronic device is the air conditioner, the processor may determine the weak cooling symptom caused by: a blocked space of the outdoor device, the increased load of the outdoor device, the blocked inlet of the outdoor device, the blocked inlet of the indoor device, the increased internal load of the indoor (due to the sunlight or the insufficient insulation), an air conditioner installed with insufficient capacity, and options not selected appropriately in accordance with the temperatures and loads of the indoor and outdoor devices.

In addition, in case that the electronic device is the air conditioner, the processor may determine whether the inlet of the outdoor device is blocked.

In this case, the processor may determine a difference between an outdoor temperature measured at a predetermined first time and an outdoor temperature measured at a predetermined second time, after the air conditioner is turned on.

For example, the processor may determine whether the outdoor temperature is 45 degrees or more at 21 minutes after the air conditioner is turned on, and whether 10 degrees or more is obtained by subtracting the outdoor temperature at 7 minutes after the air conditioner is turned on from the outdoor temperature at 21 minutes after the air conditioner is turned on. If this situation is the case, the processor may determine that the inlet of the outdoor device of the air conditioner is blocked.

In this case, the processor may determine the weak cooling symptom of the air conditioner is caused by the blocked inlet of the outdoor device, and then provide a corresponding guide.

In addition, in case that the electronic device is the air conditioner, the processor may calculate the evaporation amount using the temperature sensor. For example, the processor may calculate the evaporation amount based on a temperature difference at a predetermined time interval after the air conditioner is turned on. The processor may determine that the evaporation amount is lower as the temperature difference at the predetermined time interval is greater in a state in which a refrigerant valve is open to the maximum. In case that the evaporation amount is low, the processor may determine that the refrigerant is insufficient.

In this case, the processor may determine that the weak cooling symptom of the air conditioner is caused by the insufficient refrigerant, and then provide the user terminal device with a content indicating that the refrigerant is insufficient.

In this case, the processor may provide a corresponding guide.

In addition, in case that the electronic device is the air conditioner, the processor may determine whether the internal load of the indoor is increased by comparing the temperatures measured by the sensor with each other.

The sensor may measure an indoor temperature at 7 minutes after the air conditioner is initially turned on, and this temperature may be hereinafter described as the indoor temperature (at 7 minutes). The processor may determine that the internal load of the indoor is increased in case that 3 degrees or more is obtained by subtracting a user set temperature from the indoor temperature (at 7 minutes) and 2 degrees or less is obtained by subtracting a current indoor temperature from the indoor temperature (at 7 minutes). In this case, the processor may determine that the internal load of the indoor is increased due to strong sunlight or insufficient insulation of an internal facility.

In addition, in case that the electronic device is the air conditioner, the processor may determine whether the inlet of the indoor device is blocked by comparing the temperatures measured by the sensor with each other.

The processor may provide the user terminal device with a content indicating that the inlet of the indoor device is blocked in case that a condition to enter a freeze prevention control is continuously detected twice in a state in which the indoor and outdoor temperatures are 20 degrees or more and the indoor air conditioner is turned on.

The user may use a temperature value, a temperature change amount and the like as the condition to enter a freeze prevention control, and may also use other conditions.

TABLE 2

| Product | No. | Symptom | Cause | Determination condition | Note |
|---|---|---|---|---|---|
| Washing machine | 1 | Wash power degraded | Low temperature of supplied water in winter | A = Temperature of washing water after completing water supply for performing a main washing operation & A <10° C. | Supplied water supposed to have a set water temperature in case of being supplied at about 15 to 20° C. In case that water is supplied at about 10 degrees or less, the wash power having a possibility of being degraded at a wash course performed under the set water temperature. |
| | 2 | Wash power degraded | Washing operation performed at a low revolution per minute (RPM) to prevent fabric damage in some courses (e.g., a wool course) | Check whether the current wash course is the wool course or not | Check the course and option settings at the time of starting the washing |

TABLE 2-continued

| Product | No. | Symptom | Cause | Determination condition | Note |
|---|---|---|---|---|---|
| | 3 | Wash time increased | Increased wash time due to more laundry load than usual | Heavy laundry weight detected at least 2 times among the latest 5 data | Check the course and detected weight value |
| | 4 | Wash time increased | Water supply filter clogged (due to lime water) | A: Average of water supply time for 25 times after the washing machine is installed & B: Average of the latest 25 water supply times | Scale occurring in the water supply filter due to the lime water |
| | 5 | Wash time increased | Water drainage filter clogged (due to foreign material) | A: Average of water drainage time for 25 times after the washing machine is installed & B: Average of the latest 25 water drainage times & B ≥ A × 1.5 | Foreign material accumulated in the laundry |
| | 6 | Drainage clogged | Drainage clogged due to freezing | A: Temperature ° C. of washing water at the time of draining the water & A <5° C. | Check the temperature value of the wash water measured by a temperature sensor |
| | 7 | Door not opened | Washing machine filled with washing water | A: Value of a water level at the time at the time of finishing the washing & A >25000 | Value of water level at the time of finishing the washing |
| | 8 | Door not opened | High temperature | A = Temperature sensor value in a wash mode & A <65° C. & B = temperature sensor value in a drying mode & B >55° C. | Temperature of the washing machine at the time of finishing the washing |
| | 9 | Door not opened | Door not open due to a selected child lock function | Selected option = Setting the child lock function | Check whether the child lock function is set |
| | 10 | Laundry boiling function failed | Laundry boiling function failed in winter | A = Temperature of washing water after completing water supply for the main washing operation & A <10° C. & B = Highest temperature of the washing water during the washing operation & B <50 C. & C = Course & C = Sanitize | Check whether the supplied water has a target water temperature |
| | 11 | Only hot water supplied | Cold water and hot water reversed to each other | A = Temp (index) & A = cold & B: Temperature of washing water after completing water supply for the main washing operation & B >35° C. | Temperature of the supplied water in case of selecting the cold water |
| | 12 | Laundry not dehydrated (Related symptom: Wet laundry after dehydration) | Maximum RPM not reached during dehydration or Short operation time after the maximum RPM | A = Completion rate (or success rate) & A <0.8 | Completion rate = number of successful dehydration/ number 5 of dehydration trials *Criterion for successful dehydration: 600 rpm or more |

Referring to Table 2, in case that the electronic device is the washing machine, the processor may check the following symptoms: the wash power degraded due to the low temperature of the supplied water or a selected wash course for delicate clothes; the wash time increased due to the increased laundry load, the clogged water supply filter and the clogged water drainage filter; the drainage clogged due to the freezing; the automatically locked door after performing drying/boiling function or due to the set child lock function; the door not opened due to the washing machine filled with water caused by the freezing or the foreign material clogging the filter; the laundry boiling function failed in case that the temperature of the supplied water is 10 degrees or less; the cold water and hot water reversed to each other; and a laundry imbalance and the failure in laundry dehydration due to the laundry load which is too little or too much.

Meanwhile, in case that the electronic device is the washing machine, the processor may measure a temperature of the washing water after completing the water supply.

The processor may provide the user terminal device with a content indicating that the wash power may be degraded due to a low temperature of the supplied water in winter in case that a predetermined temperature or less is the temperature of the washing water after completing the water supply.

In this case, the processor may determine that the degraded wash power is due to the low temperature of the supplied water and provide a corresponding guide.

In addition, in case that the electronic device is the washing machine, the processor may check whether the wash mode is set to the wool course.

The processor may provide the user terminal device with a content indicating that the degraded wash power is due to the washing operation performed at the low revolution per minute (RPM) to prevent the fabric damage in case that a wash mode is in the wool course.

In case that the user repeatedly performs the washing operation in the wool course, in order to determine whether this wash mode is intentionally selected, the processor may determine that the wash power may be degraded in case of starting the washing operation in the wool course.

In addition, in case that the electronic device is the washing machine, the processor may check the data obtained from the latest five times of washing operations and then check whether the washing operation is performed with a laundry weighing heavier than a proper weight at least two times among the five data.

In case that the washing operation is performed with the laundry weighing heavier than a proper weight at least two times among the latest five laundering data, in case that a current laundry weight is heavier than the proper weight, the processor may provide the user with a content indicating that the wash time may be increased due to more laundry load than usual through the user terminal device.

In this case, the processor may provide the user terminal device with a guide to recommend the user to lower the laundry load.

In addition, in case that the electronic device is the washing machine, the processor may measure an average of the water supply time immediately after the washing machine is installed and an average of the current water supply time.

For example, the processor may calculate an average of the water supply time in performing the washing operation from the first time to the twenty-fifth time immediately after the washing machine is installed. In addition, the processor may calculate the average of the latest twenty-five water supply times and compare this average with the average measured immediately after the washing machine is installed. In this case, the number of twenty-five times may be changed by the user setting.

In case that the average of the latest water supply times has a value higher by a certain ratio than the average of the water supply time immediately after the washing machine is installed, the processor may determine the water supply filter is clogged and the wash time is increased due to this clogged water supply filter.

In this case, the processor may provide the user with a guide to solve the clogged water supply filter through the user terminal device.

In addition, in case that the electronic device is the washing machine, the processor may measure an average of the water drainage time immediately after the washing machine is installed and an average of the current water drainage time.

For example, the processor may calculate an average of the water drainage time at the time of performing the washing operation from the first time to the twenty-fifth time immediately after the washing machine is installed. In addition, the processor may calculate the average of the latest twenty-five water drainage times and compare this average with the average measured immediately after the washing machine is installed. In this case, the number of twenty-five times may be changed by the user setting.

In case that the average of the latest water drainage times has the value higher by a certain ratio than the average of the water drainage time immediately after the washing machine is installed, the processor may determine the water drainage filter is clogged. The processor may then provide the user terminal device with a content indicating that the wash time is increased due to this clogged water drainage filter.

In this case, the processor may provide the user with a guide to solve this problem through the electronic device or the user terminal device.

In addition, in case that the electronic device is the washing machine, the processor may check the temperature of the washing water at the time of draining the water.

In case that a certain temperature or less is the temperature of the washing water at the time of draining the water, the processor may determine that the clogged drainage is due to the freezing.

In this case, the processor may provide the user with a guide to solve this problem through the user terminal device.

In addition, in case that the electronic device is the washing machine, the processor may check the value of the water level at the time of finishing the washing operation. In case that the value of the water level at the time of finishing the washing operation has a value greater than a predetermined value, the processor may provide the user terminal device with a content indicating that the door is not opened because the washing machine is filled with the water.

In addition, in case that the electronic device is the washing machine, the processor may measure the temperature of the washing machine using the temperature sensor included in the washing machine.

In case that the measured temperature is a certain temperature or more, the processor may provide the user terminal device with a content indicating that the door is not opened due to the high temperature of the washing machine.

In this case, the processor may differently set the certain temperature for determining whether or not the washing machine has a high temperature depending on a current mode of the washing machine. For example, the processor may determine that the washing machine has the high temperature in case that a temperature of 65 degrees or more is measured in the wash mode and a temperature of 55 degrees or more is measured in the drying mode.

In addition, in case that the electronic device is the washing machine, the processor may check whether the washing machine is in the lock mode for child protection (i.e. child lock mode).

The processor may provide the user terminal device with a content indicating that the door is not opened because the current mode of the washing machine is in the child lock mode.

In addition, in case that the electronic device is the washing machine, the processor may measure the temperature of the washing water at the time of completing the water supply. The processor may then determine that the season is winter in case that the above measured temperature is the predetermined first temperature or less and the highest temperature during the washing operation is the predetermined second temperature.

In this case, the processor may provide the user terminal device with a content indicating that the laundry boiling function can not be provided due to a low temperature of the water supply.

In addition, in case that the electronic device is the washing machine, the processor may compare water supply temperature set by the user with a current water supply temperature to determine whether there is no problem with the cold water and hot water functions.

In this case, the processor may check whether the cold water or the hot water is selected by the user, measure the temperature of the washing water at the time of completing the water supply, and then compare the above measured temperature with the predetermined temperature. In case that the measured temperature is different from the predetermined temperature by a certain difference or more, the processor may provide the user terminal device with a content indicating that there are problems with the cold water and hot water functions.

In this case, the processor may provide the user terminal device with a content indicating that there are problems with the cold water and hot water functions and a corresponding guide.

In addition, in case that the electronic device is the washing machine, the processor may calculate a success rate in dehydration. The success rate in dehydration may refer to the number of successful dehydration divided by the number of dehydration trials. In this case, the criterion for the successful dehydration may be determined based on whether the washing machine is operated at a certain rpm or more. For example, the processor may determine that the dehydration is successful in case that the washing machine performs dehydration at 600 rpm or more.

In case that the calculated success rate in dehydration has a certain value or less, the processor may provide the user terminal device with a content indicating that there is a problem with the dehydration function.

TABLE 3

| Product | No. | Symptom | Cause | Determination condition | Note |
|---|---|---|---|---|---|
| Refrigerator | 1 | Weak cooling | Door opened and closed in an excessive number of times | In a stable (normal) operation mode, Average temperature of the fridge minus (−) Temperature under control >2° C. & Average temperature of the fridge minus (−) Defrost temperature <30° C. & On a daily basis | 50 times on a daily basis & 40 times in summer |
| | 2 | Weak cooling | hot food or too much food therein or Insufficient cold circulation | In the stable operation mode, Average temperature of the fridge minus (−) Temperature under control >2° C. & Average temperature of the fridge minus (−) Defrost temperature <30° C. | Input load or Poor sealing |
| Cooking appliance | 1 | Not heated | Door frequently opened and closed during preheating | Number of times the door opened >1 & Accumulated opening time >60 sec | |
| Robot cleaner | 1 | Failing to return home to be charged | Excessive obstacles around a charger | Ratio in which the operation from the cleaner starts its charger is 80% or more in its latest five operations & (Homing Time >9 min & Docking Time >5 min & Skip WF >9 min) | Check whether a place where the robot cleaner starts a cleaning operation = Charger & In case that the homing, docking and skip WF are N or more, the charger determined to be installed in an improper position |

Figure 3:
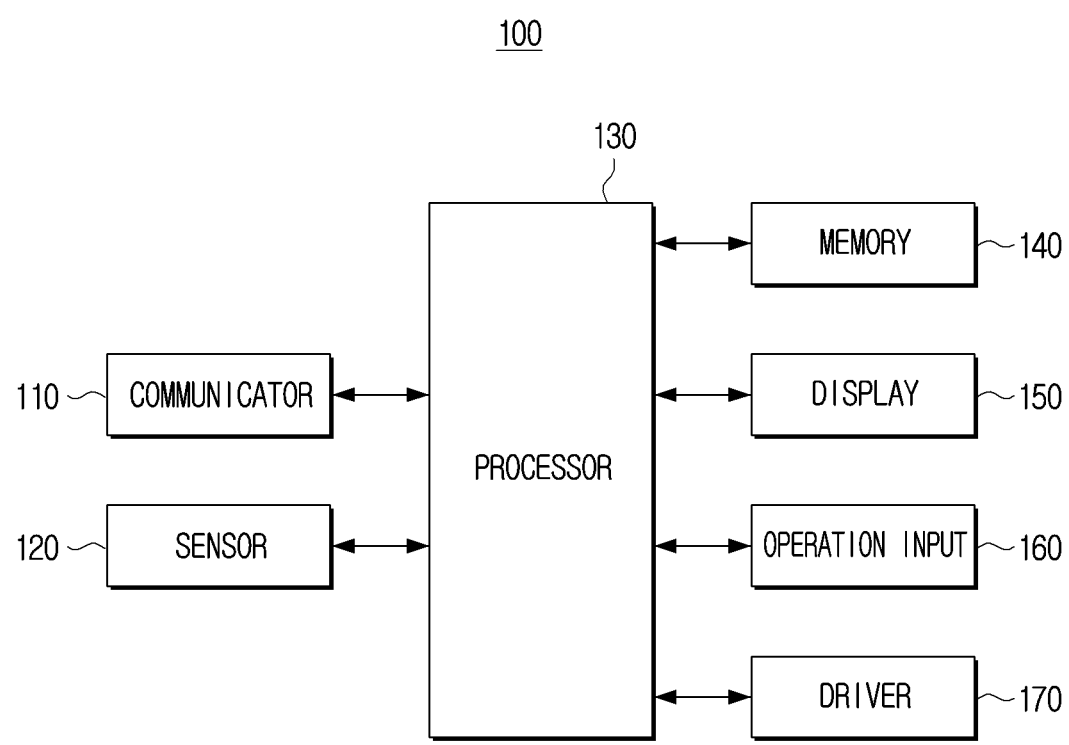
FIG. 3 is a block diagram illustrating a specific configuration of the electronic device of FIG. 1.

Referring to FIG. 3, in case that the electronic device is the refrigerator, the processor may determine whether the refrigerator door is opened and closed in an excessive number of times.

For example, the processor may determine that the user opens and closes the refrigerator door in an excessive number of times in case that 2 degrees or more is a value obtained by subtracting the user set temperature from the average temperature of the fridge, 30 degrees or less is a value obtained by subtracting the defrost temperature from the average temperature of the fridge and the fridge door is opened and closed over 50 times per day, in a state in which the refrigerator is in a normal operation mode.

In this case, the processor may count and store the number of times the user opens and closes the door in a memory. Here, this number of times may be summed and stored on a daily basis.

In this case, the processor may provide the user terminal device with a content indicating that the user opens and closes the refrigerator door in an excessive number of times and the refrigerator is thus difficult to be controlled to have the user set temperature.

In this case, the processor may provide the user terminal device with a guide describing that the refrigerator is necessary to have a reduced number of times of opening and closing for its normal operation.

Meanwhile, in case that the electronic device is the refrigerator, the processor may determine whether there is hot food or too much food in the refrigerator.

For example, the processor may determine that there is hot food or too much food in the refrigerator in case that 2 degrees or more is the value obtained by subtracting the user set temperature from the average temperature of the fridge, 30 degrees or less is the value obtained by subtracting the defrost temperature from the average temperature of the fridge, in a state in which the refrigerator is in a normal operation mode.

In this case, the processor may provide the user terminal device with a content indicating that there is hot food or too much food in the refrigerator and the refrigerator thus has a weakened performance.

If this situation is the case, the processor may count the number of times the refrigerator door is opened and closed. In case that the counted number is a predetermined number of times or more, the processor may then determine that the refrigerator has the weakened performance due to the door opened and closed in the excessive number of times. In addition, in case that the processor counts the number of times the refrigerator door is opened and closed and the counted number is less than the predetermined number of times, the processor may then determine that there is hot food or too much food in the refrigerator.

Meanwhile, in case that the electronic device is the cooking appliance, the processor may separately determine time opening the door and time closing the door.

For example, in case that the door is opened or closed once or more for a certain amount of time, the processor may measure from the time opening the door to the time closing the door. Here, in case that the accumulated door opening time is 60 seconds or more, the processor may provide the user terminal device with a content indicating that the cooking appliance fails to perform a heating operation properly.

Meanwhile, in case that the electronic device is the robot cleaner, the processor may determine whether the robot cleaner fails to return home to be charged.

For example, the processor may determine the number of times the robot cleaner successfully returns home to be charged and then determine that the robot cleaner fails to return home to be charged in case that the robot cleaner has a return failure in a certain ratio or more. In addition, the processor may determine that the robot cleaner fails to return home to be charged in case that 9 minutes or more is a homing time in which the robot cleaner returns to a place where the charger is installed and 5 minutes or more is a docking time in which the robot cleaner is docked to the charger to be charged.

In this case, the processor may determine that the charger is in an improper position and may then provide the user with a guide to clear an obstacle around the charger or a guide to reposition the charger.

Meanwhile, the numbers mentioned in each of the above conditions may be values obtained by experiments in advance and may be changed to be suitable for a user intention.

In addition, the contents of determination conditions and cause analyses shown in Tables 1 to 3 are merely exemplary and are not necessarily the same. In addition, the conditions may be changed depending on an administrator setting and the user setting.

In addition, the contents described in the Tables and the contents described in the detailed description of the disclosure are not necessarily the same, and are merely exemplary as described above. In addition, the above conditions and numbers may be changed, and the user guide information corresponding to the determined symptom may also be changed.

Meanwhile, the user terminal device 300 may be various devices including a communicator and a display, such as a smart phone and a tablet.

In this case, the user terminal device 300 may transmit data to the server 200 or receive user specific information from the server 200.

The user terminal device 300 may edit or create a file. In this case, the user terminal device may receive content from another user terminal device (not illustrated) and create a file reflecting the received content. In detail, in case of receiving a synchronization command and content from another user terminal device (not illustrated), the user terminal device may merge the received content to a specific position (e.g., cursor position or edit position) of a document file currently being edited during the edition or creation process of a file. Meanwhile, in case of implementing the user terminal device, the user terminal device may receive the synchronization command from the user, and may request content transmission to another predetermined user terminal device (not illustrated) and receive the content therefrom.

In case that the content received here is an image file containing an equation, the user terminal device may extract equation data from the image through optical character reader (OCR) operation and may insert the extracted equation data into a predetermined position in a document file currently being displayed. Alternately, in case that the received content is an image file containing text, the user terminal device may extract the text from the image through OCR operation and insert the extracted text into a predetermined position in a document file currently being displayed.

In addition, the user terminal device may transmit the file to a cloud server or another storage (e.g., a personal file server, a specific group file server (ex., learning management system (LMS)), an electronic device or the like. Here, the personal file server may be a file storage server accessible only to a user of the user terminal device, and the specific group file server may be a file storage server which may share files among group members to which the user belongs, and may be the LMS. Here, the LMS may be a learning management server which may manage class progress, materials, grades, attendance and the like online, and may file such as learning materials and results may be registered through a bulletin board for each course.

In addition, the user terminal device may provide user information to the cloud server and receive a file list including usage history information (or use-history information) of a plurality of files from the cloud server. The user information may be information for identifying the user, and may include a user identification (ID), a user name, a user's telephone number and the like. Here, the file list may be a list of files which may be managed or accessed by the user, and may include the user history information of the user on a specific file.

In addition, the user terminal device may display file information included in the received file list. In detail, the user terminal device may display a name, last modification time, file size, storage location, usage history information and the like of each file included in the file list.

Here, the user terminal device may display the files included in the file list based on the usage history of the user. In detail, the user terminal device may sort and display the files in chronological order based on the usage history of each of the plurality of files based on the received file list. Here, the user terminal device may display a plurality of histories of at least one file as a lower item of the file.

In addition, the user terminal device may receive search information (e.g., a title, a storage location, a keyword) from the user, and display file information corresponding to the search information in the received file list.

Meanwhile, the user terminal device according to the embodiment in the disclosure may display the usage history information together. Therefore, the user may search for a specific file based on the user usage history of the file, even though the user fails to remember the name or the storage of the file the user is looking for. For example, it may be assumed that the user fails to remember a name of a specific file but remembers printing the file yesterday or remember a history of sharing the file with the same another user two days ago. In this case, the user may search for the file based on the print history displayed in the displayed file list, or search for the file based on the shared history.

In addition, the user terminal device may perform various functions on a file stored in the user terminal device or a file stored in various storages. The functions here may be printing of the file, uploading the file to another file server, transmitting the file to another user and the like.

Figure 2:
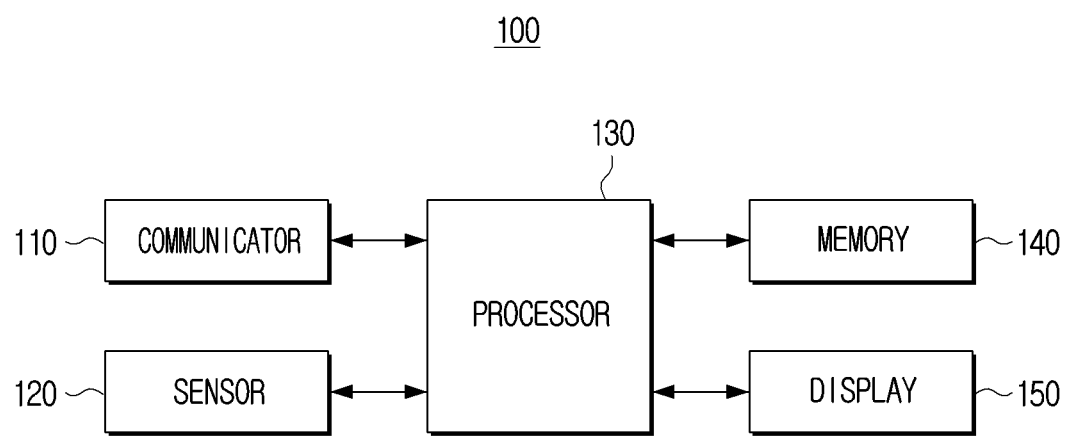
FIG. 2 is a block diagram illustrating an electronic device according to an embodiment in the disclosure.

FIG. 2 is a block diagram illustrating an electronic device 100 according to an embodiment in the disclosure.

Referring to FIG. 2, the electronic device 100 may include a communicator 110, a sensor 120, a processor 130, a memory 140 and a display 150.

The sensor 120 may be a plurality of sensors detecting whether the home appliance performs a predetermined function. The type of sensor may be a temperature sensor detecting a temperature of the home appliance. However, the sensor 120 is not limited to the temperature sensor, and may be another sensor checking whether the home appliance performs its function.

Meanwhile, the communicator 110 may transmit data detected by the plurality of sensors 120 to the server repeatedly in a predetermined period unit.

The communicator 110 may perform communication with various types of external devices in various types of communication manners. The communicator may be connected to the external device through a local area network (LAN) or an Internet network, and may be connected to the external device in a wireless communication manner (for example, Z-wave, 4 low-power wireless personal area network (LoW-PAN), radio frequency identification (RFID), device to device communication in long term evolution (LTE D2D), bluetooth low energy (BLE), general packet radio system (CPRS), weightless, edge zigbee, ANT+, near field communication (NFC), infrared data association (IrDA), Digital enhanced cordless telecommunications (DECT), wireless local area network (WLAN), bluetooth, wireless fidelity (WiFi), WiFi direct, global system for mobile communications (GSM), universal mobile telecommunications system (UMTS), long term evolution (LTE), wireless broadband internet (WiBRO) or the like. The communicator may include various communication chips such as a WiFi chip, a bluetooth chip, a near field communication (NFC) chip, a wireless communication chip and the like. The WiFi chip, the bluetooth chip, and the NFC chip may perform communication in a WiFi scheme, a bluetooth scheme and an NFC scheme, respectively. The wireless communication chip may refer to a chip performing communication depending on various communication protocols such as institute of electrical and electronics engineers (IEEE), zigbee, 3rd generation (3G), 3rd generation partnership project (3GPP), long term evolution (LTE) and the like. In addition, the communicator may include an optical receiver capable of receiving a control signal (e.g., an infrared (IR) pulse) from an external device. The communicator may receive a user command input from the external device, transmit information on a selected recommendation service to an external user terminal, and transmit and receive data with the server 200.

Meanwhile, the processor 130 may control an overall operation of the electronic device 100 and a signal flow between internal components of the electronic device 100, and may perform a function of processing data.

In this case, the processor 130 may control the electronic device 100 to periodically store data measured by the sensor 120 in the memory 140 and transmit the stored data to the server 200.

In addition, the processor 130 may change a period unit to store data in the memory 140 depending on the user intention, and may control the period unit to be changed through an update through the server 200 or the like.

In addition, the processor 130 may receive the user guide information provided by the server 200 and control the display to display the user guide information.

In addition, the processor 130 may receive guide information corresponding to performance changes of the communicator and the electronic device 100 from the server 200 and control the display to display the guide information.

Meanwhile, the memory 140 may store the data measured by the plurality of sensors 120 based on the period unit set by the processor 130.

In this case, the memory may be implemented by a non-volatile memory, a volatile memory, a flash memory, a hard disc drive (HDD), a solid state drive (SSD) or the like. Meanwhile, the memory 140 may be implemented not only as a storage medium in the electronic device 100 but also as an external storage medium, for example, a micro secure digital (SD) card, a universal serial bus (USB) memory, a web server through a network or the like.

Meanwhile, the display 150 may display an image to allow the user to view a guide provided by the processor 130. In addition, the display 150 may further display a user interface (UI) element to the user while displaying the image. In this case, the UI element may be a phrase for requesting a user selection or may be a menu displaying a plurality of recommended guides. The UI element is not limited to any specific content and may be an interface which may be recognized separately from the content.

The display 150 may be implemented such as a liquid crystal display (LCD), a plasma display panel (PDP), an organic light emitting diode (OLED) display and the like, and may be implemented as a touch screen.

Meanwhile, the electronic device 100 according to an embodiment in the disclosure may measure data on a function of the electronic device using the plurality of sensors. In addition, the electronic device 100 may measure the data at a predetermined period unit.

Accordingly, the electronic device 100 according to an embodiment in the disclosure may store data in a normal operation state as well as in an operation failure state. This data may be transmitted to the server 200 at the predetermined period unit and the server 200 may compare the data of the electronic device 100 with each other. Therefore, before the electronic device 100 enters the operation failure state, its symptom may be checked in advance.

Meanwhile, only simple components included in the electronic device 100 are illustrated and described hereinabove, but various components may be further included in the electronic device 100 at the time of implementing the device. Such various components are described below with reference to FIG. 3.

FIG. 3 is a block diagram illustrating a specific configuration of the electronic device 100 of FIG. 1.

Referring to FIG. 3, the electronic device 100 may include the communicator 110, the sensor 120, the processor 130, the memory 140, the display 150, an operation input 160 and a driver 170.

The operations of the communicator 110, the sensor 120, the processor 130, the memory 140 and the display 150 are already described above with reference to FIG. 2, and thus repetitive descriptions of these components are omitted.

The operation input 160 may include a plurality of function keys set or selected by the user in case that the display displays a guide screen provided by the server 200. The operation input may be implemented as a device such as a button, a touch pad, a mouse and a keyboard, or may be implemented as a touch screen which may perform the above described display function and the operation input function together.

The driver 170 may refer to a portion which may actually perform a function of the electronic device 100 under the control of the processor. For example, in case that the processor issues a control command to lower the temperature of the electronic device, the driver may be a portion performing a cooling function. In this case, the driver is not limited to performing any specific function and may refer to a component of the electronic device 100 which may be controlled by a user command or the processor.

Figure 4:
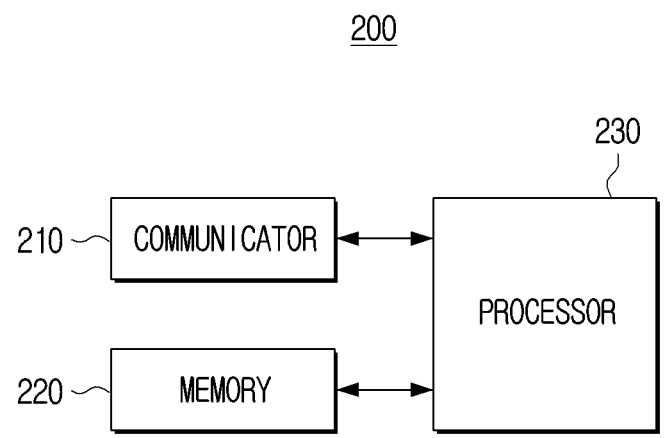
FIG. 4 is a block diagram illustrating a server according to an embodiment in the disclosure.

FIG. 4 is a block diagram illustrating a server 200 according to an embodiment in the disclosure.

Referring to FIG. 4, the server 200 may include a communicator 210, a memory 220 and a processor 230.

Meanwhile, the communicator 210 may receive data of a plurality of sensors 120 included in an electronic device 100 repeatedly in a predetermined period unit.

The communicator 210 may perform communication with various types of external devices in various types of communication manners. The communicator may be connected to the external device through a local area network (LAN) or an Internet network, and may be connected to the external device in a wireless communication manner (for example, Z-wave, 4 low-power wireless personal area network (LoW-PAN), radio frequency identification (RFID), device to device communication in long term evolution (LTE D2D), bluetooth low energy (BLE), general packet radio system (CPRS), weightless, edge zigbee, ANT+, near field communication (NFC), infrared data association (IrDA), digital enhanced cordless telecommunications (DECT), wireless local area network (WLAN), bluetooth, wireless fidelity (WiFi), WiFi direct, global system for mobile communications (GSM), universal mobile telecommunications system (UMTS), long term evolution (LTE), wireless broadband internet (WiBRO) or the like. The communicator may include various communication chips such as a WiFi chip, a bluetooth chip, a near field communication (NFC) chip, a wireless communication chip and the like. The WiFi chip, the bluetooth chip, and the NFC chip may perform communication in a WiFi scheme, a bluetooth scheme and an NFC scheme, respectively. The wireless communication chip may refer to a chip performing communication depending on various communication protocols such as institute of electrical and electronics engineers (IEEE), zigbee, 3rd generation (3G), 3rd generation partnership project (3GPP), long term evolution (LTE) and the like. In addition, the communicator may include an optical receiver capable of receiving a control signal (e.g., an infrared (IR) pulse) from an external device. The communicator may receive a user command input from the external device; may transmit information on a selected recommendation service to an external user terminal; and may transmit and receive data with the server 200.

Meanwhile, the memory 220 may store data received from the electronic device 100 in a memory or the like.

In this case, the memory 220 may be implemented by a non-volatile memory, a volatile memory, a flash memory, a hard disk drive (HDD), a solid state drive (SDD) or the like. Meanwhile, the memory 220 may be implemented not only as a storage medium in the electronic device 100 but also as an external storage medium, for example, a micro secure digital (SD) card, a universal serial bus (USB) memory, a web server through a network or the like.

Meanwhile, the processor 230 may control an overall operation of the electronic device 100 and a signal flow between internal components of the electronic device 100, and may perform a function of processing data.

In this case, the memory may store the data received in a predetermined period unit and the processor 230 may detect a performance change of the electronic device 100 by comparing data for a first period with data for a second period among the stored data, and provide guide information corresponding to the detected performance change of the electronic device 100 to the user terminal device 300 corresponding to the electronic device 100.

In this case, the processor 230 may detect the performance change measured by at least one sensor 120 may be detected among a plurality of performances of the electronic device 100 by comparing a value measured by the at least one sensor 120 for the first period with a value measured by the at least one sensor 120 for the second period.

In this case, the value measured by the at least one sensor 120 may be an average value of a plurality of data measured by the at least one sensor 120 for the first period or the second period.

In addition, the processor 230 may detect degraded performance of a water supply filter in the washing machine by comparing water supply time for the first period with water supply time for the second period detected by a water supply sensor detecting water supply of the washing machine.

In addition, the processor 230 may detect degraded performance of a water supply filter in the washing machine by comparing water supply time for the first period with the water supply time for the second period detected by a water drainage sensor detecting water drainage of the washing machine.

In addition, the processor 230 may detect whether an inlet of the outdoor device of the air conditioner is blocked by comparing an outdoor temperature for the first period with an outdoor temperature for the second period detected by an outdoor temperature sensor detecting a temperature around the outdoor device of the air conditioner.

In addition, the processor 230 may detect whether an internal load of an indoor in case that the air conditioner is operated is increased by comparing an indoor temperature for the first period with an indoor temperature for the second period detected by an indoor temperature sensor detecting the indoor temperature.

In addition, the processor 230 may provide the user with information on a location at which the detected performance change occurs and information on a scheme of the electronic device 100 together.

In addition, the processor 230 may determine whether the detected performance change is repairable by a user action or requires the professional consultation, and in case of determining that the professional consultation is required, the processor 230 may provide the user with information on a list of the after-sales service (A/S) centers closest to a user address and information on telephone numbers of the corresponding A/S centers together.

As described above, the server 200 according to an embodiment in the disclosure may compare data of the electronic device 100 with each other by performing an operation of receiving the data at a predetermined period, and may detect a performance change of the electronic device 100 by performing an operation of comparing the data with each other.

Detecting the performance change of the electronic device 100 may be different from determining whether a failure occurs from the device. Even in case that the user determines that the device has the degraded performance, the server 200 may provide the user with a guide to solve this problem.

In addition, the server 200 for providing user guide information may provide the user with a guide displaying a recommendation for a usage pattern or a mode for a specific operation. Therefore, the user may easily maintain or change a suitable setting for the user.

In addition, a guide provided by the server 200 may include a user interface (UI) element for (After-Sales Service) A/S request. Therefore, it may be convenient for the user who does not need to separately deliver information and symptoms of the electronic device 100 to a counselor for a long time.

In addition, through a process of detecting the performance change of the device and notifying this change to the user, the server 200 may recognize an incorrect usage operation of the device although the user does not determine that the device has the failure. In a long term view, life expectancy of the electronic device 100 may be extended and the consumer may have increased satisfaction, by correcting such an incorrect usage of the device which is not recognized by the user.

Figure 5:
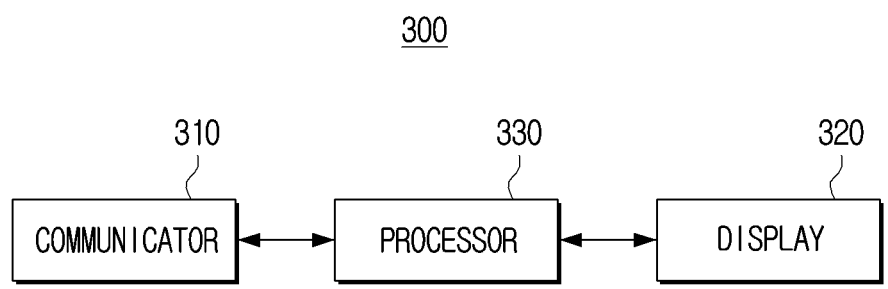
FIG. 5 is a block diagram illustrating a simple configuration of a user terminal device.

FIG. 5 is a block diagram illustrating a simple configuration of a user terminal device.

Referring to FIG. 5, the user terminal device may include a communicator 310, a processor 330, and a display 320.

Meanwhile, the communicator 310 may receive the user guide information from the server 200. In addition, the communicator may exchange information with the server 200 and may thus exchange information necessary for membership registration, login and the like.

The communicator 310 may perform communication with various types of external devices in various types of communication manners. The communicator may be connected to the external device through a local area network (LAN) or an Internet network, and may be connected to the external device in a wireless communication manner (for example, Z-wave, 4 low-power wireless personal area network (LoW-PAN), radio frequency identification (RFID), device to device communication in long term evolution (LTE D2D), bluetooth low energy (BLE), general packet radio system (CPRS), weightless, edge zigbee, ANT+, near field communication (NFC), infrared data association (IrDA), digital enhanced cordless telecommunications (DECT), wireless local area network (WLAN), bluetooth, wireless fidelity (WiFi), WiFi direct, global system for mobile communications (GSM), universal mobile telecommunications system (UMTS), long term evolution (LTE), wireless broadband internet (WiBRO) or the like. The communicator may include various communication chips such as a WiFi chip, a bluetooth chip, a near field communication (NFC) chip, a wireless communication chip and the like. The WiFi chip, the bluetooth chip, and the NFC chip may perform communication in a WiFi scheme, a Bluetooth scheme and an NFC scheme, respectively. The wireless communication chip may refer to a chip performing communication depending on various communication protocols such as institute of electrical and electronics engineers (IEEE), zigbee, 3rd generation (3G), 3rd generation partnership project (3GPP), long term evolution (LTE) and the like. In addition, the communicator may include an optical receiver capable of receiving a control signal (e.g., an infrared (IR) pulse) from an external device. The communicator may receive a user command input from the external device; may transmit information on a selected recommendation service to an external user terminal; and may transmit and receive data with the server 200.

Meanwhile, the processor 330 may control an overall operation of the electronic device 100 and a signal flow between internal components of the electronic device 100, and may perform a function of processing data.

Meanwhile, the display 320 may display an image to allow the user to view a guide provided by the processor. In addition, the display 320 may further display a user interface (UI) element to the user while displaying the image. In this case, the UI element may be a phrase for requesting a user selection or may be a menu displaying a plurality of recommended guides. The UI element is not limited to any specific content and may be an interface which may be recognized separately from the content.

The display 320 may be implemented such as a liquid crystal display (LCD), a plasma display panel (PDP), an organic light emitting diode (OLED) display and the like, and may be implemented as a touch screen.

Meanwhile, only simple components included in the user terminal device 300 are illustrated and described hereinabove, but various components may be further included in the user terminal device 300 at the time of implementing the device. Such various components are described below with reference to FIG. 6.

Figure 6:
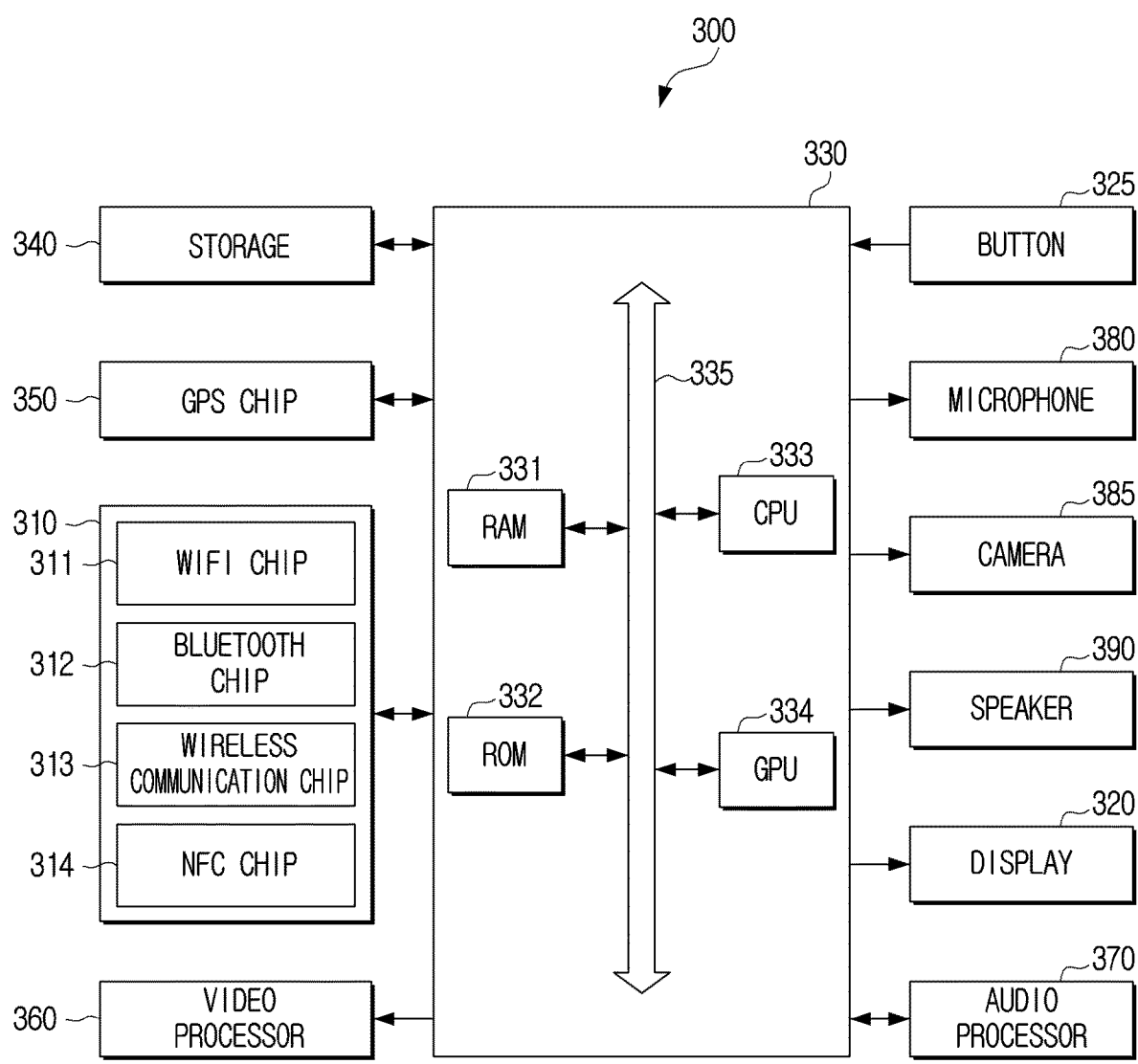
FIG. 6 is a block diagram illustrating a specific configuration of a user terminal device.

FIG. 6 is a block diagram illustrating a specific configuration of a user terminal device.

Referring to FIG. 6, the user terminal device 300 may include the communicator 310, the display 320, the processor 330, a storage (memory) 340, a global positioning system (GPS) chip 350, a video processor 360, an audio processor 370, a button 325, a microphone 380, a camera 385, and a speaker 390.

The communicator 310 may perform communication with various types of external devices in various types of communication manners. The communicator 310 may include a wireless fidelity (WiFi) chip 311, a bluetooth chip 312, a wireless communication chip 313, and a near field communication (NFC) chip 314. The processor 330 may perform communication with various external devices using the communicator 310.

The WiFi chip 311 and the Bluetooth chip 312 may perform communication in a WiFi manner and a Bluetooth manner, respectively. In the case of using the WiFi chip 311 or the bluetooth chip 312, various kinds of connection information such as a service set identifier (SSID), a session key and the like, is first transmitted and received, communication is connected using the connection information, and various kinds of information may then be transmitted and received. The wireless communication chip 313 may refer to a chip performing communication depending on various communication protocols such as institute of electrical and electronics engineers (IEEE), zigbee, 3rd generation (3G), 3rd generation partnership project (3GPP), long term evolution (LTE) and the like. The NFC chip 314 may refer to a chip operated in the NFC manner using a band of 13.56 MHz among various radio frequency identification (RFID) frequency bands such as 335 kHz, 13.56 MHz, 433 MHz, 860 to 960 MHz, 2.45 GHz and the like.

The NFC chip 314 may be used for user authentication in the electronic device. In detail, in case that the user terminal device 300 is disposed on the NFC chip of the electronic device, the NFC chip 314 may transmit the user information to the electronic device to perform the user authentication.

In addition, the NFC chip 314 may transmit a command for performing reservation printing to the electronic device 100.

As described above, the display 320 may display file information included in the received file list and display a user interface window for receiving a user control command for the displayed file information. The display 320 may be implemented by various types of displays such as a liquid crystal display (LCD), an organic light emitting diode (OLED) display, a plasma display panel (PDP) and the like. A driving circuit, a backlight unit and the like, that may be implemented in a form such as an amorphous Si (a-si) thin film transistor (TFT), a low temperature poly silicon (LIPS), a thin film transistor (TFT), an organic TFT (OTFT) and the like, may be included in the display 320. In addition, the display 320 may be implemented as a flexible display.

Meanwhile, the display 320 may include a touch sensor detecting a user touch gesture. The touch sensor may be implemented by various types of sensors such as a capacitive type sensor, a resistive type sensor, a piezoelectric type sensor and the like. The capacitive touch sensor may use a scheme of calculating a touch coordinate by sensing micro electricity excited to a user body using a dielectric material coated on a surface of the display in case that a portion of the user body touches the surface of the display. The resistive touch sensor may include two electrode plates embedded in the display and use a scheme of calculating a touch coordinate by sensing a current flowing due to a contact between upper and lower electrode plates at a touch point in the case that the user touches a screen. In addition, in case that the user terminal device 300 also supports a pen input function, the display 320 may detect a user gesture using an input member such as a pen in addition to a user finger. In case that the input member is a stylus pen including a coil, the user terminal 300 may include a magnetic field detection sensor detecting a magnetic field changed by the coil in the stylus pen. Accordingly, the user terminal 300 may detect not only the user touch gesture but also a user proximate gesture, i.e. a user hovering.

Meanwhile, a single display 320 is described above as performing both a display function and a touch gesture detection function, however, the display function and the gesture detection function may be performed by different components. That is, the display 320 may be implemented by combining a display device capable of only displaying an image and a touch panel capable of only detecting a user touch.

The storage (memory) 340 may store various programs and data required for an operation of the user terminal device 300. In detail, the storage (memory) 340 may store programs and data for configuring various UIs constituting a user interface window.

In addition, the storage (memory) 340 may store various contents. Here, the content may be a printable document file or an image file. In addition, the storage (memory) 340 may store a plurality of telephone numbers.

In addition, the storage (memory) 340 may store content received from another user terminal device (not illustrated), and may store equations, text or the like extracted from the received content. In addition, the storage (memory) 340 may store print data for the file.

In addition, the storage (memory) 340 may store a plurality of applications. Here, at least one of the applications may be a printer driver, a scan driver, a printer application, a file management application or the like for an operation as disclosed herein.

The processor 330 may display the user interface window on the display 320 using the programs and data stored in the storage (memory) 340. In addition, in case that the user touches a specific area of the user interface window, the processor 330 may perform a control operation corresponding to the touch.

The processor 330 may include a random access memory (RAM) 331, a read only memory (ROM) 332, a central processing unit (CPU) 333, a graphic processing unit (GPU) 334, and a bus 335. The RAM 331, the ROM 332, the CPU 333, the GPU 334 and the like, may be connected to each other through the bus 335.

The CPU 333 may access the storage (memory) 340 to perform booting using an operating system (O/S) stored in the storage (memory) 340. In addition, the CPU 333 may perform various operations using various programs, contents, data and the like, stored in the storage (memory) 340.

An instruction set for booting a system, or the like, may be stored in the ROM 332. In case that a turn-on command is input to supply power, the CPU 333 may copy the O/S stored in the storage (memory) 340 to the RAM 331 depending on an instruction stored in the ROM 332, and execute the O/S to boot the system. In case that the booting of the system is completed, the CPU 333 may copy various programs stored in the storage (memory) 340 to the RAM 331, and execute the programs copied in the RAM 331 to perform various operations.

In case that the booting of the user terminal 300 is completed, the GPU 334 may display the UI on the display.

In detail, the GPU 334 may render a screen including various objects such as an icon, an image, a text and the like using a calculator (not illustrated) and a renderer (not illustrated). The calculator may calculate attribute values such as coordinate values at which the respective objects are displayed, forms, sizes, colors and the like of the respective objects depending on a layout of a screen. The renderer may render screens of various layouts including objects on the basis of the attribute values calculated in the calculator. The screen (or user interface window) rendered by the renderer may be provided to the display 320, and the display 320 may display the provided screen.

The GPS chip 350 is a component receiving a global positioning system (GPS) signal from a GPS satellite and calculating a current position of the user terminal device 300. The processor 330 may calculate a user location using the GPS chip 350 in case that a navigation program is used or a user current location is required. In detail, the processor 330 may calculate the user current position through the GPS chip 350 in case that a reservation print command is input, and transmit the calculated user current position along with destination information input from the user to the server 200 as moving path information.

In addition, in case of receiving alarm information from the cloud server, the processor 330 may calculate the user current location through the GPS chip 350 and transmit the calculated user current location to the cloud server. Accordingly, the cloud server may search for an available electronic device on the moving path in consideration of the current position of the user terminal device 300. Meanwhile, the processor 330 may be implemented to generate user location information in consideration of user location information calculated by the GPS chip 350 as well as user location information calculated by the WiFi or wireless communication module.

The video processor 360 may be a component processing video data included in a content received through the communicator 310 or a content stored in the storage (memory) 340. The video processor 360 may perform various kinds of image processing such as decoding, scaling, noise filtering, frame rate converting, resolution converting and the like of the video data.

The audio processor 370 may be a component processing audio data included in a content received through the communicator 310 or a content stored in the storage (memory) 340. The audio processor 370 may perform various kinds of processing such as decoding, amplifying, noise filtering and the like of the audio data.

In case that a reproduction application for a multimedia content is executed, the processor 330 may drive the video processor 360 and the audio processor 370 to reproduce the multimedia content. Here, the display 320 may display an image frame created by the image processor 360 in at least one of a main display region and a sub display region.

The speaker 390 may output the audio data created by the audio processor 370.

The button 325 may be various types of buttons such as a mechanical button, a touch pad, a wheel and the like, formed in any region such as a front surface portion, a side surface portion, a rear surface portion and the like of a body appearance of the user terminal device 300. The button 325 may include a '+' button disposed at the side surface portion of the body appearance and receiving a command to increase a volume and a '−' button to receive a command to decrease the volume.

The microphone 380 may be a component receiving a user voice or other sounds and converting the user voice or the other sounds into audio data. The processor 330 may use the user voice input through the microphone 380 in a call process or convert the user voice into the audio data and store the converted audio data in the storage (memory) 340. Meanwhile, the microphone 380 may include a stereo microphone receiving a sound from a plurality of positions.

The camera 385 may be a component capturing a still image or a video depending on a user control. The camera 385 may be implemented by a plurality of cameras such as a front camera and a rear camera. As described above, the camera 385 may be used to obtain a user image in an embodiment for tracking the user sight line.

In case of including the camera 385 and the microphone 380, the processor 330 may perform a control operation depending on the user voice input through the microphone 380 or a user motion recognized by the camera 385. That is, the user terminal device 300 may be operated in a motion control mode or a voice control mode. In case that the user terminal device 300 is operated in the motion control mode, the processor 330 may activate the camera 385 to capture the user image, track a change in the user motion, and perform a control operation corresponding to the tracked change. In case that the user terminal device 300 is operated in the voice control mode, the processor 330 may analyze the user voice input through the microphone 380, and may be operated in a voice recognition mode of performing a control operation depending on the analyzed user voice.

In the user terminal device 300 supporting the motion control mode or the voice control mode, a voice recognition technology or a motion recognition technology may be used in the diverse embodiments described above. For example, in case that the user takes a motion as if he/she selects an object displayed on a home screen or utters a voice instruction corresponding to the object, the user terminal device 300 may determine that the corresponding object is selected, and perform a control operation matched to the object.

Although not illustrated in FIG. 4, according to an embodiment, the user terminal device 300 may further include a universal serial bus (USB) port which may be connected to a USB connector, various external input ports for connection to various external terminals such as a headset, a mouse, a local area network (LAN) and the like, a digital multimedia broadcasting (DMB) chip receiving and processing a DMB signal, various sensors and the like.

Figure 7:
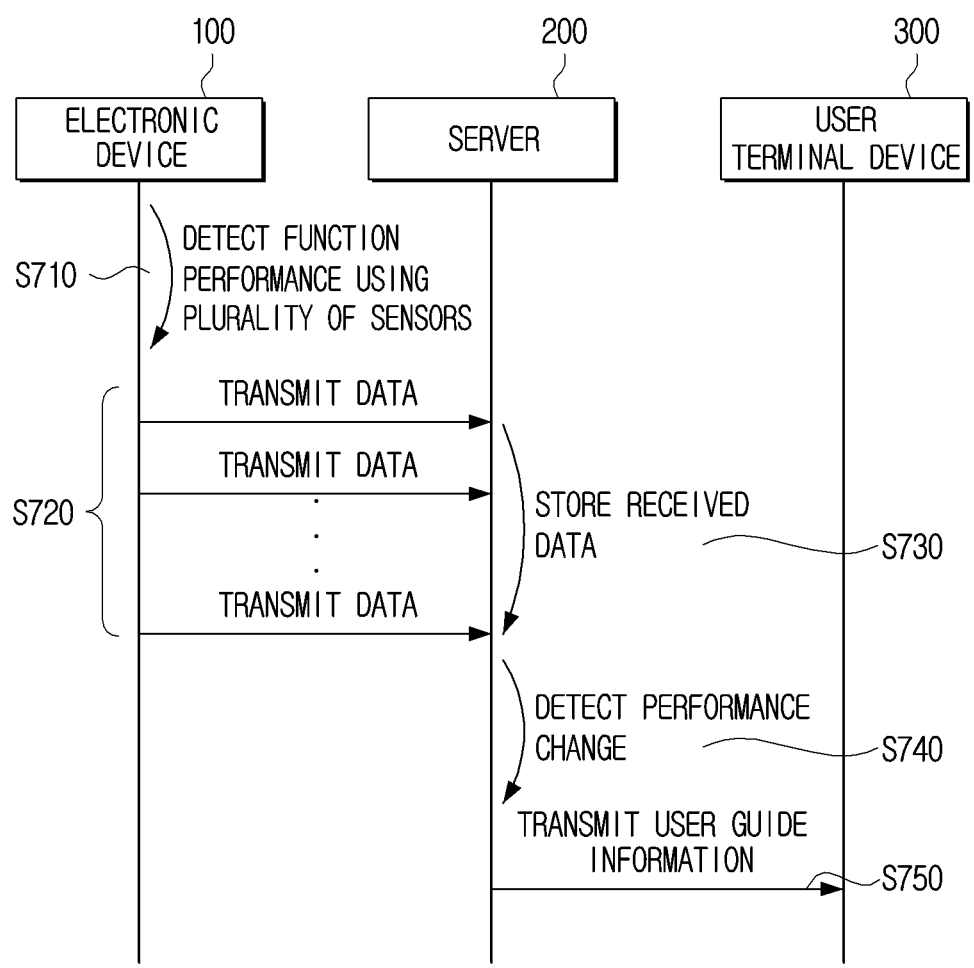
FIG. 7 is a sequence diagram illustrating a system for providing user guide information according to an embodiment in the disclosure.

FIG. 7 is a sequence diagram illustrating a system for providing user guide information according to an embodiment in the disclosure.

Referring to FIG. 7, the electronic device 100 may measure data using a plurality of sensors detecting whether the electronic device 100 performs its function (S710). In this case, the electronic device 100 may transmit the data to the server 200 at a predetermined period (S720). The predetermined period may be changed by a user setting. The electronic device 100 may immediately transmit the measured data to the server 200, store the data in the memory 220 and transmit the measured data to the server 200 at a specific time point after the storing.

In addition, the server 200 may store the data received from the electronic device 100 (S730). The server 200 may detect whether the performance of the electronic device 100 is changed based on the stored data (S740). In this case, the performance change of the electronic device 100 may indicate that the performance of the electronic device 100 is weakened after elapse of a usage period compared to its performance at the time of its first installation.

In addition, the performance change may indicate that the electronic device 100 fails to perform its normal function due to a user specific action and the user specific action may indicate that the user uses the electronic device 100 in an incorrect manner.

In addition, the server 200 may transmit user guide information corresponding to a portion where the performance change is detected to the user terminal device 300 (S750).

Figure 8:
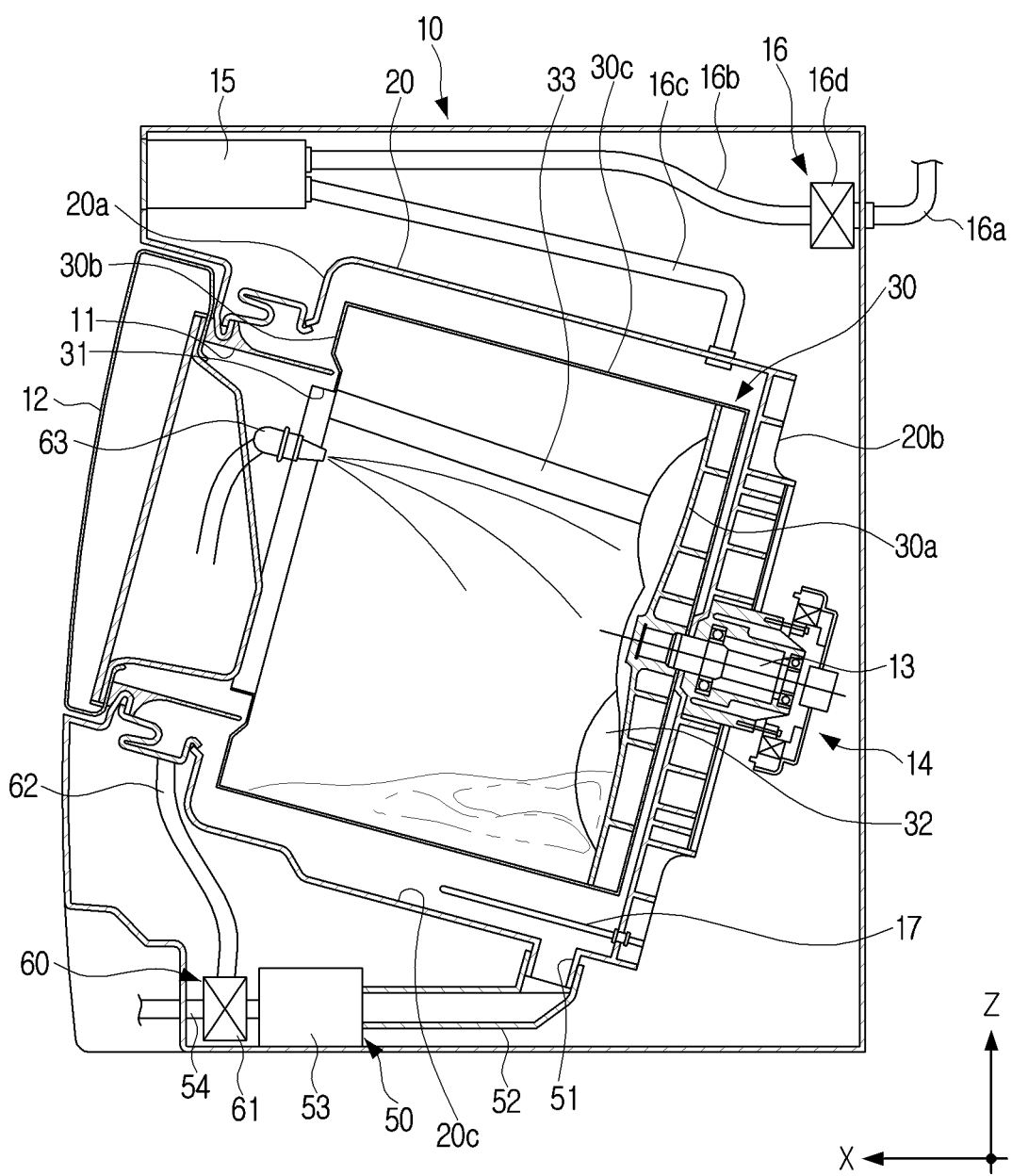
FIG. 8 is a cross-sectional diagram illustrating a washing machine according to an embodiment in the disclosure.

FIG. 8 is a cross-sectional diagram illustrating a washing machine according to an embodiment in the disclosure.

A drum washing machine is hereinafter described by way of example, and the disclosure is not limited thereto. That is, a configuration of a washing tub according to the disclosure may also be applied to a top load-type automatic washing machine.

Referring to FIG. 8, the washing machine according to an embodiment in the disclosure may include a body 10 having a front surface on which an inlet 11 for laundry input is formed, a water tank 20 installed in the body 10 and storing washing water therein, and a washing tub 30 rotatably provided in the water tank 20 and accommodating the laundry therein. In addition, the washing machine may include a door 12 opening and closing the inlet 11 of the body 10.

The water tank 20 may be installed to be inclined at an predetermined angle with respect to an installation surface of the washing machine 1 so that a front surface portion 20a thereof in which an inlet is formed is positioned to be higher than that of a rear surface portion 20b thereof. The washing tub 30 disposed in the water tank 20 may also be installed to be inclined in the same form as that of the water tank 20. However, the water tank and the washing tub are not limited thereto, and may also be installed not to be inclined.

The washing tub 30 may be rotatably supported by a driving shaft 13 coupled to a rear surface portion 30a thereof and penetrating through the rear surface portion 20b of the water tank 20. In addition, a driving motor 14 rotating the driving shaft 13 may be installed outside the rear surface portion 20b of the water tank 20. The driving motor 14 may rotate the driving shaft 13, thereby rotating the washing tub 30 disposed in the water tank 20. The driving motor 14 may rotate the washing tub 30 at a low speed at the time of performing washing, and rotate the washing tub 30 at a high speed in one direction at the time of performing dehydration.

A detergent supplier 15 supplying a detergent to an inner portion of the water tank 20 and a water supplier 16 supplying washing water to the inner portion of the water tank 20 may be installed above the water tank 20. The detergent supplier 15 may be installed at the front surface portion of the body 10. The water supplier 16 may include a first water supply pipe 16b connecting an external water supply pipe 16a and the detergent supplier 15, a second water supply pipe 16c connecting the detergent supplier 15 and the water tank 20, and a water-supply control valve 16d installed on the first water supply pipe 16b and controlling water supplying. This configuration is to allow the water supplied to the inner portion of the water tank 20 to pass through the detergent supplier 15, and thereby the detergent may be supplied to the water tank 20 together with the water.

A heater 17 heating the washing water of the water tank 20 may be installed at a lower portion of an inner portion of the water tank 20. A heater accommodator 20c protruding downwardly may be provided at a lower portion of the water tank 20 to install the heater 17 in the above manner. This configuration is to allow the washing water to be collected in the heater accommodator 20c while allowing the heater 17 to be accommodated in the heater accommodator 20c.

A water drainage 50 draining the washing water in the water tank 20 and a washing water circulator 60 supplying the washing water in the water tank 20 into the washing tub 30 may be installed below outside the water tank 20. The water drainage 50 may include a first water drainage pipe 52 connected to a drainage hole 51 installed at the lower portion of the water tank 20, a water drainage pump 53 installed on the first water drainage pipe 52, and a second water drainage pipe 54 connected to an outlet of the water drainage pump 53.

The washing water circulator 60 may include a flow path switch valve 61 installed on the second water drainage pipe 54 connected to the outlet of the water drainage pump 53, a washing water circulation pipe 62 extended from the flow path switch valve 61 to an inlet 31 of the washing tub 30, and a spray nozzle 63 installed at an output of the washing water circulation pipe 62. The flow path switch valve 61 may switch a flow path so that the washing water at the outlet of the water drainage pump 53 is drained to the outside or flows to the washing water circulation pipe 62.

The flow path switch valve 61 may be a general electromotive three-way valve. This configuration is to allow the washing water in the water tank 20 to be sprayed to an inner portion of the washing tub 30 through the first water drainage pipe 52 and the washing water circulation pipe 62 in case that the water drainage pump 53 is operated in a state in which the flow path switch valve 61 is operated so that the washing water flows to the washing water circulation pipe 62. The washing water of the water tank 20 may be drained in case that the water drainage pump 53 is operated in a state in which the flow path switch valve 61 is operated so that the washing water flows to the second water drainage pipe 54 guiding the washing water to the outside.

The washing tub 30 may be formed in a cylindrical shape, and may include the rear surface portion 30a coupled to the driving shaft 13, a front surface portion 30b in which the inlet 31 is formed, and a circumferential portion 30c formed in a cylindrical shape and having both ends coupled to the front surface portion 30b and the rear surface portion 30a, respectively. A plurality of lifters 33 lifting and dropping the laundry in the washing tub 30 at the time of rotating the washing tub may be installed on an inner surface of the circumferential portion 30c of the washing tub 30, and a plurality of agitating protrusions 32 for improving washing force may be formed on an inner surface of the rear surface portion 30a of the washing tub 30. In addition, a pattern including one or more depressed portions and one or more dehydrating holes may be arranged on an inner surface of the washing tub 30.

The inner surface of the circumferential portion 30c of the washing tub 30 may be an inner circumferential surface of the washing tub 30.

FIGS. 9 to 13 are diagrams illustrating various examples of a user guide provided by a server 200. In the following drawings, the term "providing" may refer to providing information so that a user guide information displayed on the user terminal device 300 or the electronic device 100 may be displayed.

Figure 9:
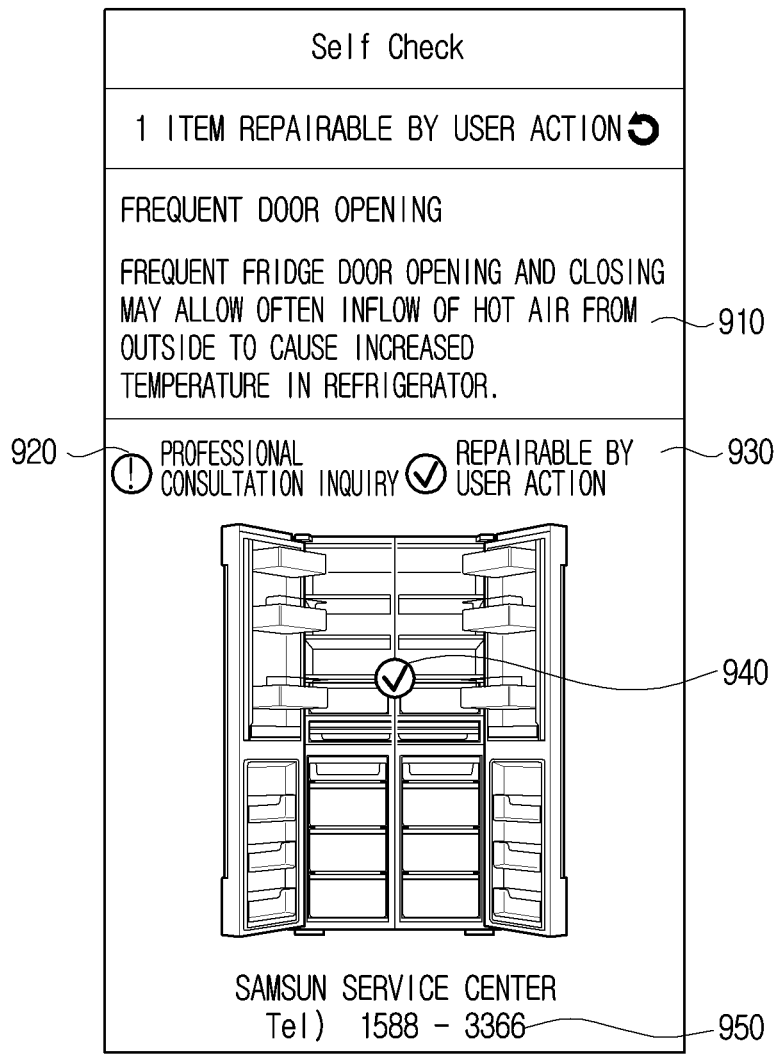
FIGS. 9 to 13 are diagrams illustrating various examples of a user guide provided by a server.

Referring to FIG. 9, the server 200 may analyze data to provide a matter repairable by a user action and a matter requiring a professional consultation as separate items. In this case, the server 200 may also provide a number for each item.

In this case, the server 200 may provide problems of an item repairable by the user action or an item requiring the professional consultation, and may provide an impact 910 on the electronic device 100 in case that the problem persists.

In addition, the server 200 may provide a guide separately distinguishing an item 920 requiring the professional consultation inquiry and an item 930 repairable by the user action.

In addition, in case that the corresponding item is an item repairable by the user action, the server 200 may provide a picture of the electronic device 100 and information on where the problem occurs for user convenience (940). Even in case that the professional consultation inquiry is required, the server may display this problem on an overview diagram of the electronic device 100 (940).

In addition, in case of determining that professional consultation is required, the server 200 may provide the user with the user interface (UI) element indicating a request for a visiting service to a corresponding after-sales service (A/S) center together with the telephone number of the corresponding after-sales service (A/S) center (950).

In this case, the user address may be a user current location or a pre-stored user address and the server 200 may provide a list of after-sales service (A/S) centers closest to the user address.

Figure 10:
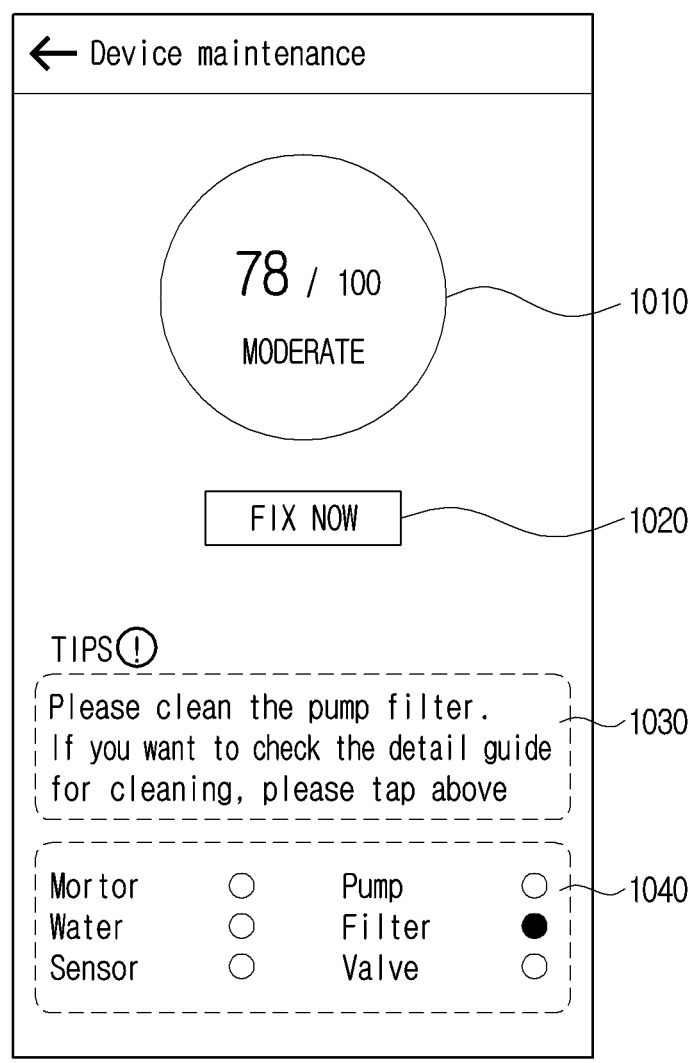

Referring to FIG. 10, the server 200 may analyze the data received from the electronic device 100 and provide a current data value. In this case, the server 200 may provide an operation state of the electronic device 100, which is divided into normal, caution and failure (1010). Although displayed as 'moderate' in FIG. 10, this display is an example of dividing the data and may be changed depending on the user setting.

In this case, the server 200 may provide a separate guide to the user as to whether or not the device is possible to be repaired immediately (1020).

In addition, the server 200 may provide a summary of the items repairable by the user action and in case that the user requires a detailed action, the server 200 may provide a screen to guide the user to touch a corresponding portion. In this case, the server 200 may provide a separate screen in case that the user touches the screen for a detailed guide (1030).

In addition, the server 200 may list the components of the electronic device 100 and separately provide a component in question for the user to easily view the problem (1040).

Figure 11:
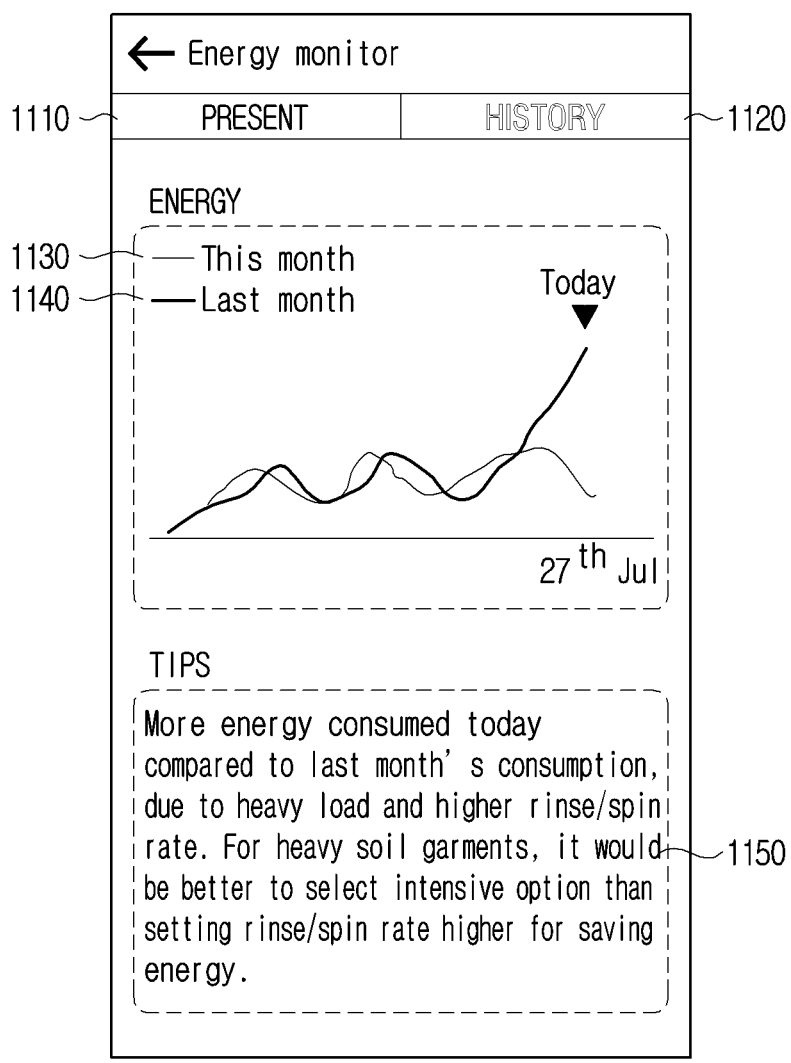

Referring to FIG. 11, the server 200 may distinguish current data items and past data items of the electronic device 100 and display these data items (1110 and 1120).

The server 200 may provide data transmitted by the electronic device 100 in a graph. In this case, the server 200 may also provide a comparison target graph for the user to easily compare the two graphs with each other. For example, in case that today is July 27, the server may provide graphs showing today's data and June 27 data.

For example, the server 200 may provide a guide displaying data 1130 for a current month and data 1140 for the last month in a single set of graphs.

In this case, the current graph and the comparison graph may be provided for each day, week and month, and may be differently provided for each function of the electronic device 100.

In addition, the server 200 may provide a separate screen for the user to view the past data of the electronic device 100 thereon (1120).

In addition, the server 200 may provide a guide indicating an item requiring a user attention or an item to be repaired by the user together with a graph based on current data (1150).

Figure 12:
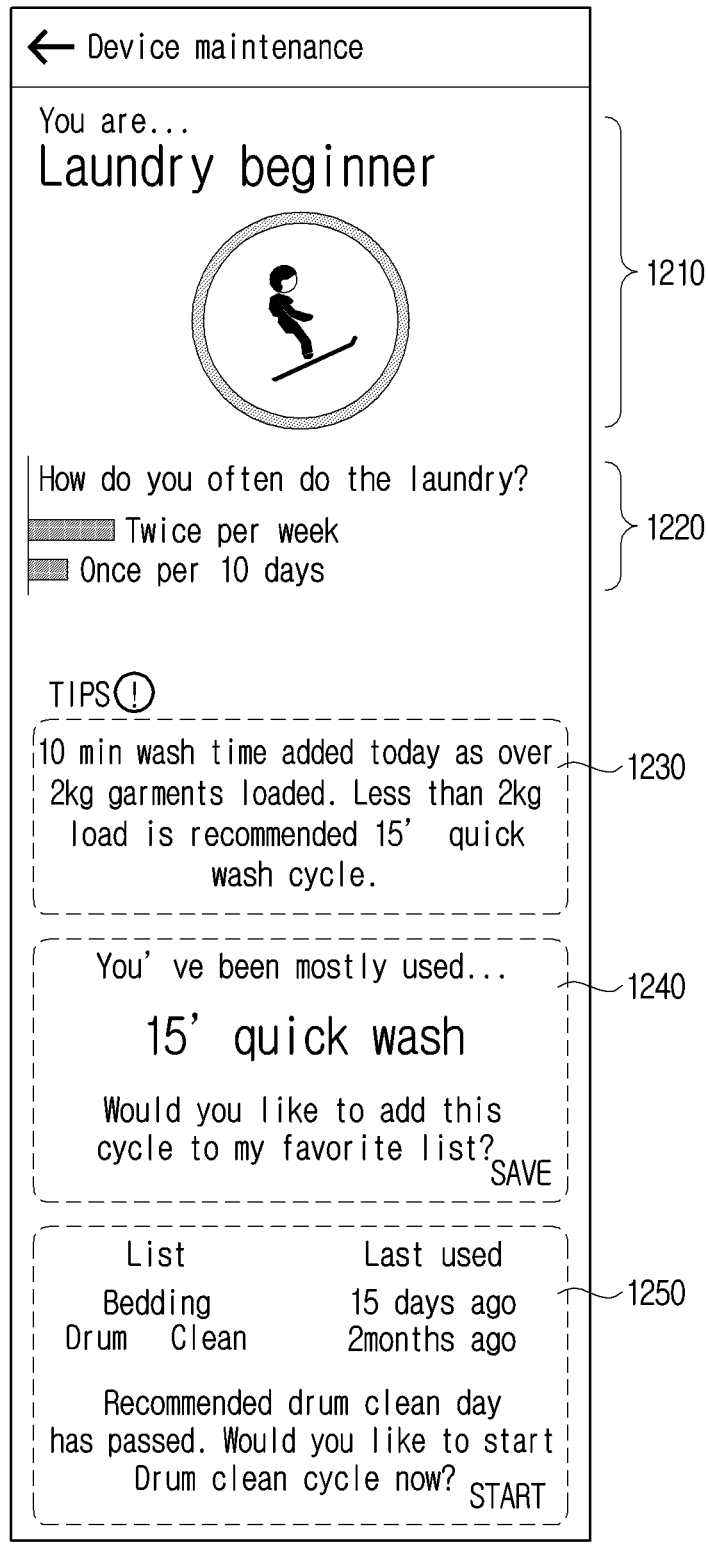

Referring to FIG. 12, the server 200 may analyze a function of the electronic device 100 used by the user to provide a user level (1210). The user level may be divided into a beginner level, intermediate level, master level and the like, depending on how often the user uses a particular function. In addition, the user level may be determined based on whether the user uses the performance of the electronic device 100 effectively by analyzing the user's usage pattern.

In addition, the server 200 may provide a graph of how often the user uses the electronic device 100. In this case, the server 200 may provide the graph counting number of times in which each function of the electronic device 100 is used (1220).

In addition, the server 200 may propose a separate mode depending on a user usage type of the electronic device 100. For example, the server 200 may inform the user that the laundry load may be heavier than a metered load by 2 kg and the wash time is thus increased by 10 minutes. In this case, the server 200 may recommend a fast wash mode (15 minutes' quick wash) (1230).

In addition, the server 200 may provide a mode or menu of the electronic device 100 which is frequently used by the user (1240). In this case, the server 200 may ask the user whether to add the corresponding menu to a user favorite list and provide a UI element for addition of this menu.

In addition, the server 200 may list each mode selected by the user and provide when the mode was recently used (1250). In this case, the server 200 may recommend a mode not used for a long time.

Figure 13:
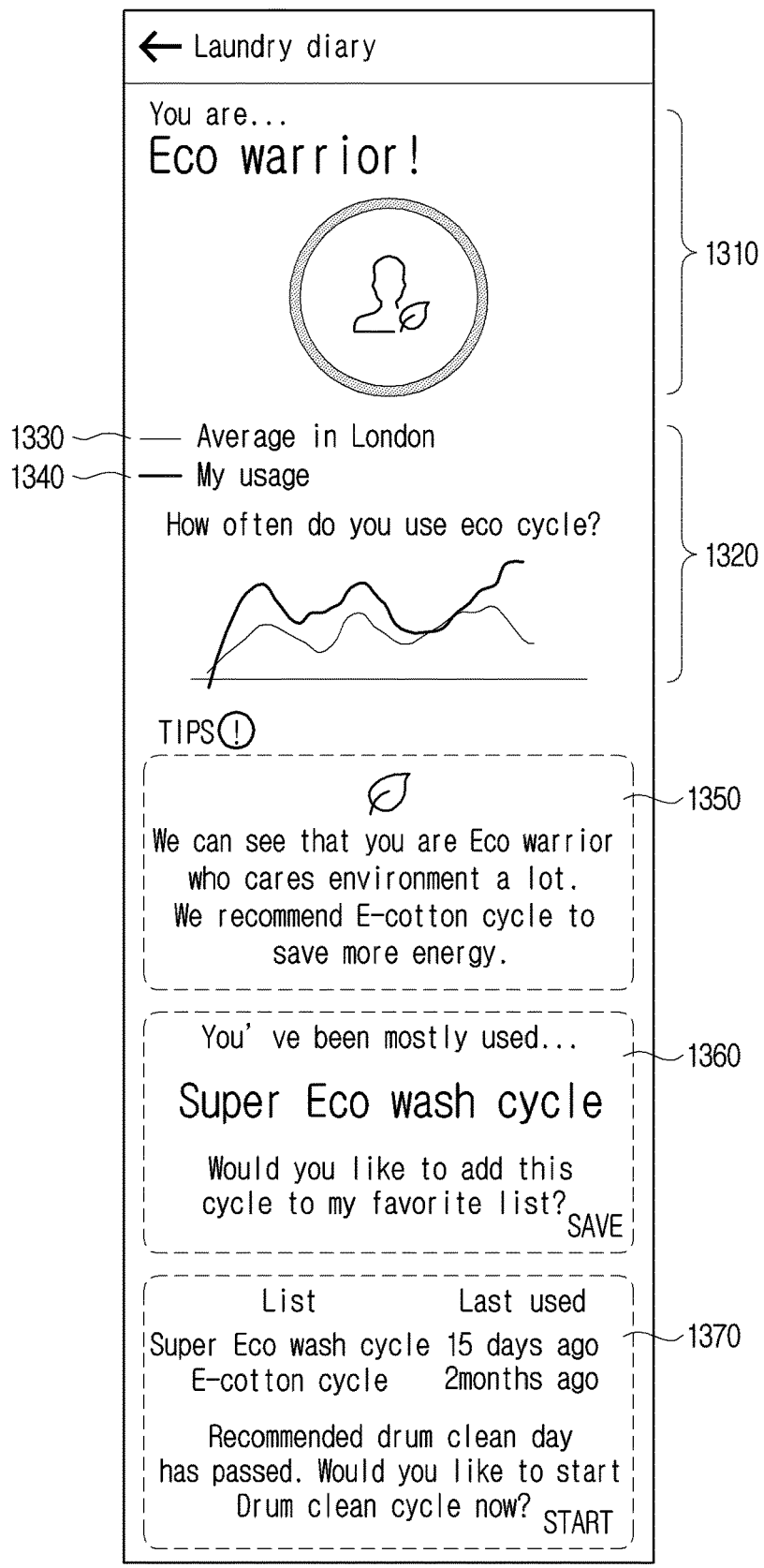

Referring to FIG. 13, the server 200 may analyze the user's usage pattern of the electronic device 100 to determine whether the pattern is a usage method to properly maintain energy efficiency of the electronic device 100. In this case, the server 200 may determine how often the user uses an environment mode (energy saving mode) provided by the electronic device 100.

In this case, the server 200 may divide user environment levels. In case that the user uses the electronic device 100 more than a certain number of times, the server 200 may provide a guide indicating how much energy is saved by providing the user with the user environmental level such as poor, average or super on the screen (1310). Although FIG. 13 uses the expression ECO WARRIOR, which may be changed.

In addition, the server 200 may provide, through a graph, how much the user uses the environmental mode (energy saving mode) based on a time period. For example, the guide may display information on a graph comparing user usage data 1340 with a comparison target data 1330. Although FIG. 13 illustrates an average usage in London, which may be changed.

In addition, the server 200 may provide the user's current environmental level and recommend a more efficient energy saving mode (1350).

In this case, the server 200 may provide the most popular environmental mode (energy saving mode) and may provide a UI element asking the user to add the most popular environmental mode (energy saving mode) to the user favorite list (1360).

In addition, the server 200 may list each mode selected by the user and provide when the mode was recently used. In this case, the server 200 may provide a guide displaying a content recommending a mode not used for a long time or a mode in which the energy may be saved more efficiently (1370).

Figure 14:
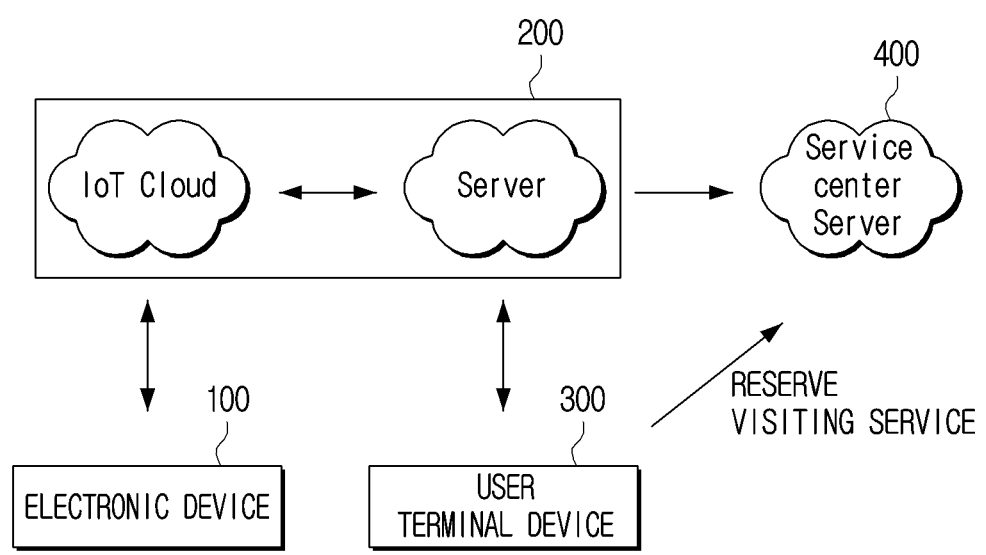
Figure 15:
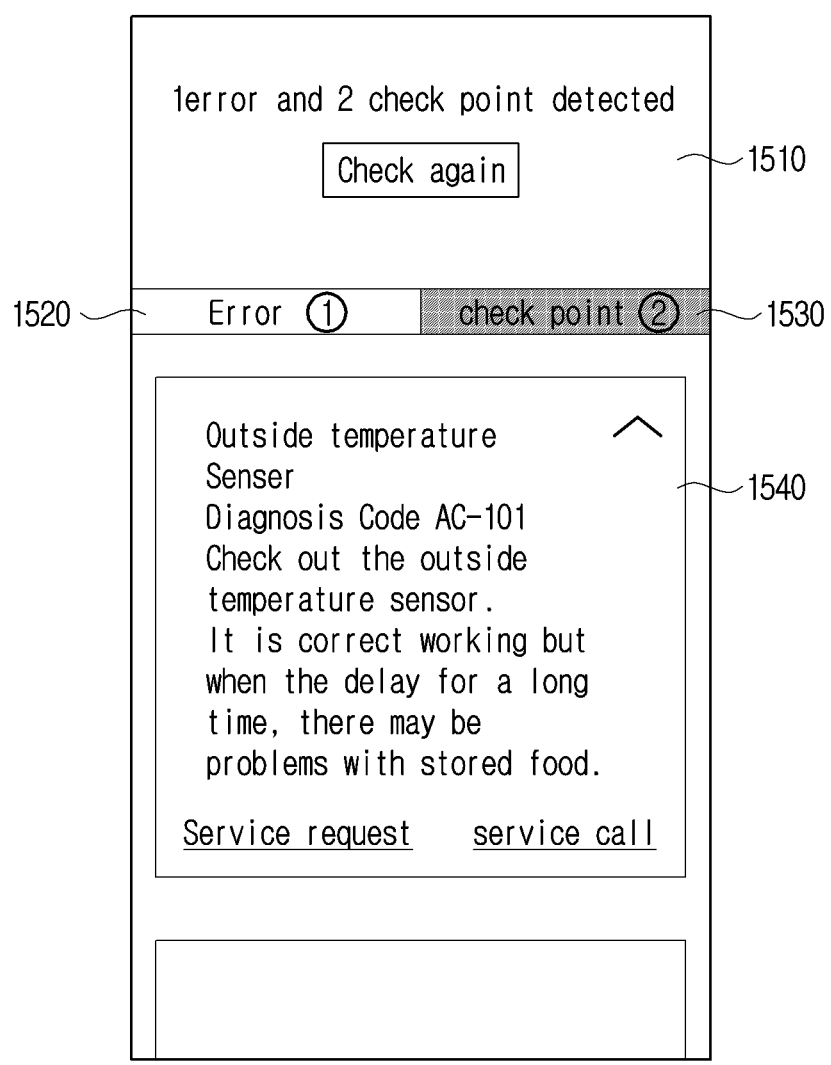
Figure 16:
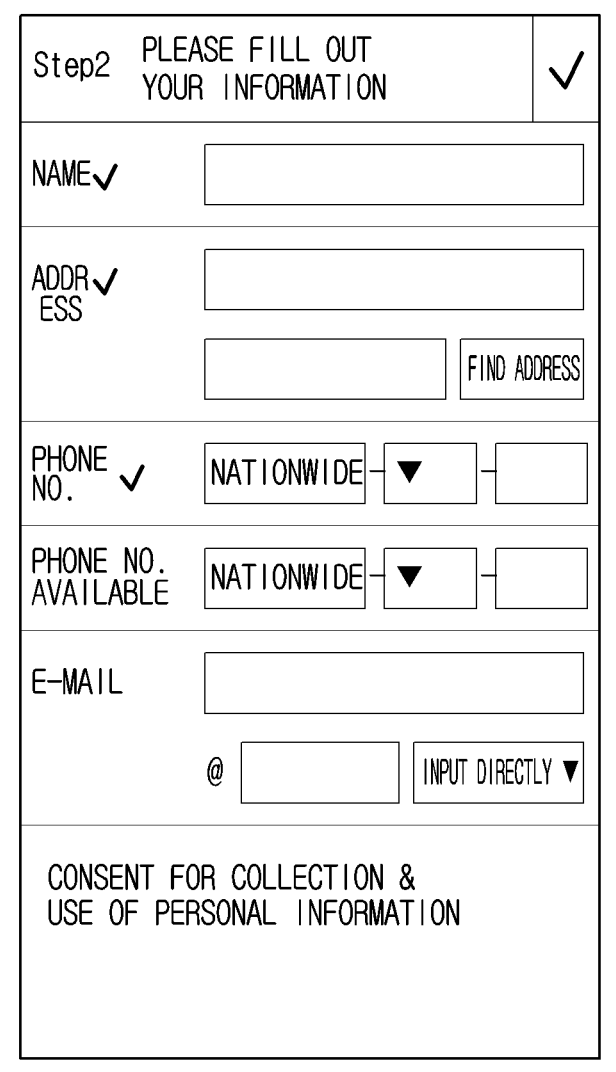

FIGS. 14 to 16 are diagrams illustrating a method for requesting a service in a user terminal device 300.

Referring to FIG. 14, in case that the server 200 or the user determines that a professional consultation inquiry is required, the user may directly contact an after-sales service (A/S) center and reserve a visiting service. In this case, the user may request an A/S of a specific electronic device 100 directly using the user terminal device.

In this case, the user terminal device 300 may transmit the information on the A/S request to the server 200 after completing the request. The server 200 may then provide an A/S center server 400 with existing data on the use of the electronic device 100 by the user based on the received information.

Referring to FIG. 15, in relation to the electronic device 100 connected to the user current terminal device 300, the server 200 may provide, as separate lists, an error item 1520 and a check item 1530 of the electronic device 100 together with a guide displaying summary information 1510 thereof.

In this case, the server 200 may include information on the error item 1520 and the check item 1530 and display a guide corresponding to each item together. In addition, the server 200 may provide a guide displaying at least one of a request for a visiting service to the A/S center and a telephone number of the A/S center together (1540).

FIG. 16 illustrates a screen which may be implemented in case that the user requests for a visiting service through the user terminal device 300. In this case, the screen may display a UI element requesting consent for a collection and use of personal information together.

Figure 17:
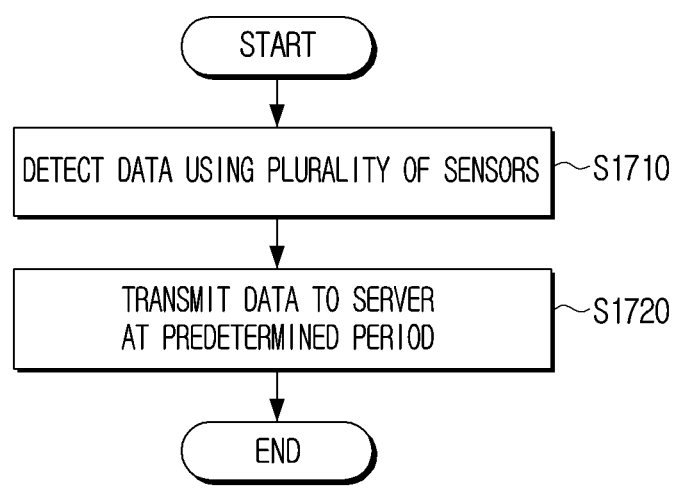
FIG. 17 is a flow chart illustrating a data transmission method of an electronic device according to an embodiment in the disclosure.

FIG. 17 is a flow chart illustrating a data transmission method of an electronic device 100 according to an embodiment in the disclosure.

Referring to FIG. 17, the electronic device 100 may detect data for performing each function using the plurality of sensors 120 (S1710). In this case, the electronic device 100 may transmit the data to the server 200 at a predetermined period (S1720). As described above, the electronic device 100 may change a predetermined period of a data transmission depending on a user setting. That is, the electronic device 100 may be set to transmit data not at a certain point in time, but from a moment at which the electronic device 100 is turned on to a moment at which the electronic device 100 is turned off.

Figure 18:
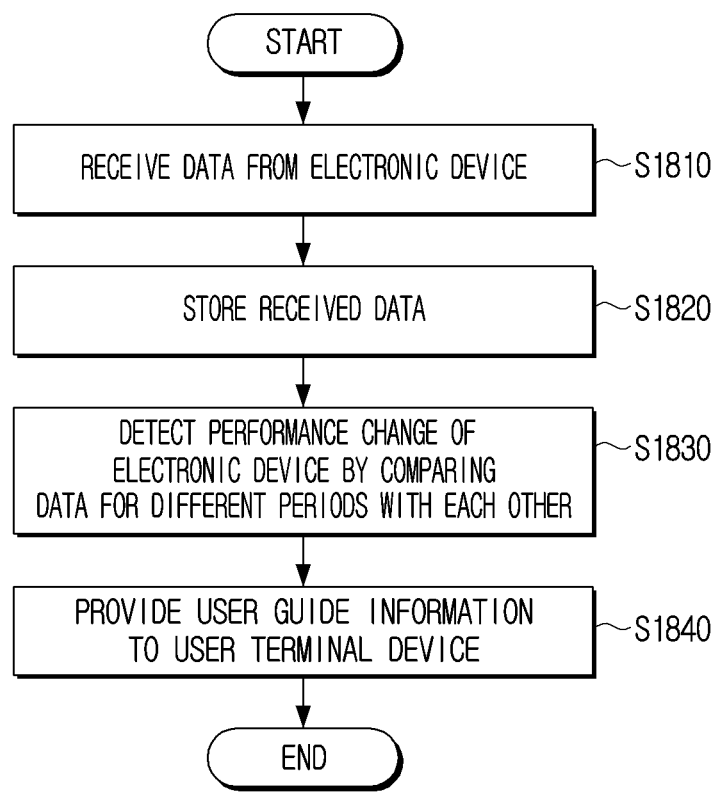
FIG. 18 is a flowchart illustrating a method for providing user guide information in a server according to an embodiment in the disclosure.

FIG. 18 is a flowchart illustrating a method for providing user guide information in a server 200 according to an embodiment in the disclosure.

Referring to FIG. 18, the server 200 may receive data from the electronic device 100 (S1810). In this case, the server 200 may store the received data (S1820).

In addition, the server 200 may detect a performance change of the electronic device 100 by comparing corresponding data for different periods with each other (S1830). In this case, the server may compare respective data for different periods with each other such as a first period and a second period.

However, the period is not limited thereto, and the first period may be a period for collecting data on 10 times of operations of the electronic device 100 immediately after installed, and the second period may be a period for collecting data on the latest 10 times of operations of the electronic device 100.

In addition, the electronic device 100 may change a predetermined period of a data transmission depending on a user setting. That is, the electronic device 100 may be set to transmit data not at a certain point in time, but from a moment at which the electronic device 100 is turned on to a moment at which the electronic device 100 is turned off.

In response, the server 200 may analyze the data to identify a problem and provide user guide information corresponding to the problem to the user terminal device (S1840).

Figure 19:
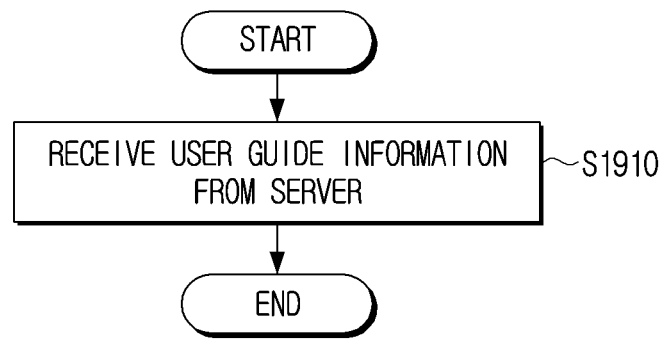
FIG. 19 is a flowchart illustrating a method for receiving a user guide in a user terminal device according to an embodiment in the disclosure.

FIG. 19 is a flowchart illustrating a method for receiving a user guide in a user terminal device 300 according to an embodiment in the disclosure.

Referring to FIG. 19, the user terminal device 300 may receive the user guide information from the server 200 (S1910). In this case, the user may additionally select an UI element indicating the request for a visiting service, which is also displayed in the guide information. The user terminal device 300 may then provide corresponding information to the A/S center server.

Figure 20:
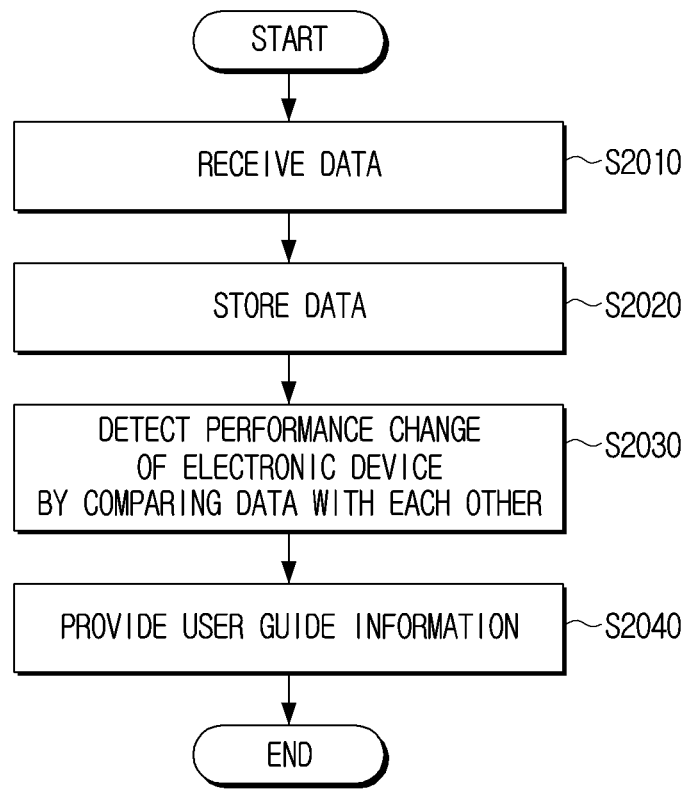
FIG. 20 is a flowchart schematically illustrating a method for providing user guide information in a server according to an embodiment in the disclosure.

FIG. 20 is a flowchart schematically illustrating a method for providing user guide information in a server 200 according to an embodiment in the disclosure.

Referring to FIG. 20, the server 200 may receive data from the electronic device 100 and the user terminal device 300 (S2010). In this case, the server 200 may store the received data in the memory 220 (S2020).

In addition, the server 200 may detect whether the performance of the electronic device 100 is changed by comparing the stored data with each other (S2030). In this case, the performance change of the electronic device 100 may refer to a symptom of a degraded performance of the electronic device 100.

In addition, the server 200 may provide the user guide information corresponding to the detected change of the electronic device 100 to the electronic device 100 or the user terminal device 300 (S2040).

Meanwhile, a method for providing information in a server 200 may include: receiving data of a plurality of sensors 120 included in the electronic device 100 repeatedly in a predetermined period unit; storing the data received in the predetermined period unit; detecting a performance change of the electronic device 100 by comparing the data for the first period with the data for the second period among the stored data; and providing user guide information on the detected performance change to the user terminal device 300 corresponding to the electronic device 100.

In this case, in the detecting of the performance change, the performance change measured by at least one sensor 120 may be detected among a plurality of performances of the electronic device 100 by comparing a value measured by the at least one sensor 120 for the first period with a value measured by the at least one sensor 120 for the second period.

In this case, the value measured by the at least one sensor 120 may be an average value of a plurality of data measured by the at least one sensor 120 for the first period or the second period.

In this case, in the detecting of the performance change, degraded performance of a water supply filter in the washing machine may be detected by comparing water supply time for the first period with water supply time for the second period detected by a water supply sensor detecting water supply of the washing machine.

In addition, in the detecting of the performance change, the degraded performance of a water supply filter in the washing machine may be detected by comparing water supply time for the first period with the water supply time for the second period detected by a water drainage sensor detecting water drainage of the washing machine.

In addition, in the detecting of the performance change, whether an inlet of the outdoor device of the air conditioner is blocked may be detected by comparing an outdoor temperature for the first period with an outdoor temperature for the second period detected by an outdoor temperature sensor detecting a temperature around the outdoor device of the air conditioner.

In addition, in the detecting of the performance change, whether an internal load of an indoor in case that the air conditioner is operated is increased may be detected by comparing an indoor temperature for the first period with an indoor temperature for the second period detected by an indoor temperature sensor detecting the indoor temperature.

In addition, in the providing of the user guide information, information on a location at which the detected performance change occurs and information on a scheme of the electronic device 100 may be provided together.

In addition, in the providing of the user guide information, it may be determined whether the detected performance change is repairable by the user action or requires the professional consultation, and in case of determining that the professional consultation is required, information on a list of the after-sales service (A/S) centers closest to the user address and information on telephone numbers of the corresponding after-sales service (A/S) centers may be provided together.

According to the method for providing information according to an embodiment in the disclosure, data of the electronic device 100 may be compared with each other by performing an operation of receiving the data at a predetermined period, and a performance change of the electronic device 100 may be detected by performing an operation of comparing the data with each other.

The detecting of the performance change of the electronic device 100 may be different from determining whether a failure occurs from the device. Even in case that the user determines that the device has the degraded performance, the user may be provided with a guide to solve this problem.

In addition, the server may provide the user with a guide displaying a recommendation for a usage pattern or a mode for a specific operation. Therefore, the user may easily maintain or change a suitable setting for the user.

In addition, a guide provided by the server 200 may include the UI element for A/S request. Therefore, it may be convenient for the user who does not need to separately deliver information and symptoms of the electronic device 100 to a counselor for a long time.

In addition, through a process of detecting the performance change of the device and notifying this change to the user, the server 200 may recognize an incorrect usage operation of the device although the user does not determine that the device has the failure. In a long term view, life expectancy of the electronic device 100 may be extended and the consumer may have increased satisfaction, by correcting such an incorrect usage of the device which is not recognized by the user.

In addition, the method for providing the user guide information in the server 200 as described above may be implemented by at least one execution program to execute the method for providing the information as described above. Such an execution program may be stored in a non-transitory readable medium.

The non-transitory computer readable medium is not a medium that stores data therein for a while, such as a register, a cache, a memory or the like, but is a medium that semi-permanently stores data therein and is readable by a device. In detail, the various applications or programs described above may be stored and provided in the non-transitory computer readable medium such as a compact disk (CD), a digital versatile disk (DVD), a hard disk, a blu-ray disk, a universal serial bus (USB), a memory card, a read only memory (ROM) or the like.

Meanwhile, although the case in which all the components configuring an embodiment in the disclosure are combined with each other as one component or are combined and operated with each other is described, the disclosure is not necessarily limited thereto. That is, all the components may also be selectively combined and operated with each other as one or more components without departing from the scope of the disclosure. In addition, although each of all the components may be implemented by one independent hardware, some or all of the respective components which are selectively combined with each other may be implemented by a computer program having a program module performing some or all of functions combined with each other in one or plural hardware. Codes and code segments configuring the computer program may be easily inferred by those skilled in the art to which the disclosure pertains. The computer program is stored in non-transitory computer readable media and is read and executed by a computer, thereby making it possible to implement an embodiment in the disclosure.

Here, the non-transitory computer readable medium is not a medium that stores data therein for a while, such as a register, a cache, a memory or the like, but is a medium that semi-permanently stores data therein and is readable by a device. In detail, the programs described above may be stored and provided in the non-transitory computer readable medium such as a CD, a DVD, a hard disk, a blu-ray disk, a USB, a memory card, a ROM or the like.

Although the embodiments are illustrated and described in the disclosure as above, the disclosure is not limited to the above mentioned specific embodiments, and may be variously modified by those skilled in the art to which the disclosure pertains without departing from the gist in the disclosure as disclosed in the accompanying claims. These modifications should also be understood to fall within the scope and spirit in the disclosure.

The invention claimed is:

1. A method for providing information in a server comprising:
   receiving data of a plurality of sensors corresponding to performance of a predetermined function of an electronic device over a predetermined period of time from the electronic device while the electronic device is performing the predetermined function;
   storing the data of the plurality of sensors received over the predetermined period of time;
   detecting a performance change of the electronic device by comparing data for a first period obtained from among the stored data of the predetermined period of time with data for a second period obtained from among the stored data of the predetermined period of time;
   determining whether the detected performance change is repairable by a user action or requires a professional consultation; and
   providing user guide information including an indication that the detected performance change is repairable by the user action or requires the professional consultation according to the determining and corresponding to the detected performance change to a user terminal device corresponding to the electronic device, wherein the user guide information includes information on a list of after-sales service (A/S) centers closest to a user address and information on telephone numbers of corresponding A/S centers.

2. A home appliance comprising:

a plurality of sensors detecting whether the home appliance performs a predetermined function;

a communicator transmitting data detected by the plurality of sensors to a server over a predetermined period unit while the home appliance is performing the predetermined function; and a processor configured to:

receive guide information corresponding to a performance change of the home appliance from the server based on comparing data for a first period obtained from among the data detected of the predetermined period of time with data for a second period obtained from among the detected data of the predetermined period of time, and control a display to display the guide information and an indication a as to whether the performance change is repairable by a user action or requires a professional consultation, wherein the guide information includes information on a list of after-sales service (A/S) centers closest to a user address and information on telephone numbers of corresponding A/S centers.

3. The home appliance as claimed in claim 2, wherein the home appliance is any one of an air conditioner, a washing machine, a refrigerator, a cooking appliance and a cleaner.

4. A server comprising:

a communicator receiving data of a plurality of sensors included in an electronic device over a predetermined period time, the data of the plurality of sensors corresponding to a predetermined performance of the electronic device;

a memory storing the data of the plurality of sensors received in the predetermined period time; and a processor:

detecting a performance change of the electronic device by comparing data for a first period obtained from among the stored data of the predetermined period of time with data for a second period obtained from among the stored data of the predetermined period of time, determining whether the detected performance change is repairable by a user action or requires a professional consultation, and providing guide information including an indication that the detected performance change is repairable by the user action or requires the professional consultation according to the determining and corresponding to the detected performance change of the electronic device to a user terminal device corresponding to the electronic device, wherein the user guide information includes information on a list of after-sales service (A/S) centers closest to a user address and information on telephone numbers of corresponding A/S centers.

* * * * *